(12) United States Patent
Tesar et al.

(10) Patent No.: US 7,050,245 B2
(45) Date of Patent: May 23, 2006

(54) LENS ASSEMBLY AND OPTICAL IMAGING USING SAME

(75) Inventors: John Tesar, Tucson, AZ (US); Robert Lee Thompson, Rogers, AR (US)

(73) Assignee: Pinotage L.L.C., Fayetteville, AR (US)

( * ) Notice: Subject to any disclaimer, the term of this patent is extended or adjusted under 35 U.S.C. 154(b) by 0 days.

(21) Appl. No.: 10/809,793

(22) Filed: Mar. 25, 2004

(65) Prior Publication Data

US 2005/0200978 A1    Sep. 15, 2005

Related U.S. Application Data

(63) Continuation-in-part of application No. 10/798,841, filed on Mar. 11, 2004.

(51) Int. Cl.
  G02B 9/34    (2006.01)
  G02B 9/00    (2006.01)
  G02B 9/60    (2006.01)

(52) U.S. Cl. .................. 359/771; 359/754; 359/763

(58) Field of Classification Search ............ 359/754, 359/763, 771, 772, 764
  See application file for complete search history.

(56) References Cited

U.S. PATENT DOCUMENTS

| | | | |
|---|---|---|---|
| 2,117,252 A | 5/1938 | Lee | |
| 2,701,982 A | 2/1955 | Angenieux | |
| 2,807,983 A | 10/1957 | Tronnier | |
| 2,894,431 A | 7/1959 | Miles | |
| 3,504,961 A | 4/1970 | Hoogland et al. | |
| 3,560,079 A | 2/1971 | Wakimoto et al. | |
| 3,634,001 A | 1/1972 | Shimada | |
| 3,840,290 A | 10/1974 | Betensky et al. | |
| 4,009,943 A | 3/1977 | Horimoto | |
| 4,111,529 A | 9/1978 | Yamashita | |
| 4,291,952 A | 9/1981 | Takase et al. | |
| 4,319,809 A | 3/1982 | Abel | |
| 4,621,284 A | 11/1986 | Nishioka et al. | |

(Continued)

FOREIGN PATENT DOCUMENTS

DE    196 33 286 A    2/1998

(Continued)

OTHER PUBLICATIONS

International Search Report PCT/US2005/008260 dated Dec. 23, 2005.

*Primary Examiner*—Loha Ben
*Assistant Examiner*—Jack Dinh
(74) *Attorney, Agent, or Firm*—Wolf, Greenfield & Sacks P.C.

(57) ABSTRACT

A lens assembly includes, in order from an object side to an image side: a first lens; a first meniscus lens in optical communication with the first lens; a second meniscus lens in optical communication with the first meniscus lens; an aperture stop in optical communication with the second meniscus lens; a fourth lens in optical communication with the aperture stop; and a bi-convex lens in optical communication with the fourth lens. The lens assembly is a four group, five element, lens assembly that is constructed so that at least one of the lenses may be replaced without also requiring the other lenses in the assembly to be significantly changed, resulting in a "flexible" construction. The lens assembly may be adapted to provide a field of view of approximately 15 degrees; approximately 0% vignetting within the field of view; and a distortion of the image of less than approximately 1%. Multiple lens assemblies and detectors may be provided in a single housing.

10 Claims, 15 Drawing Sheets

U.S. PATENT DOCUMENTS

| | | |
|---|---|---|
| 4,644,845 A | 2/1987 | Garehime, Jr. |
| 4,674,844 A | 6/1987 | Nishioka et al. |
| 4,697,210 A | 9/1987 | Toyota et al. |
| 4,745,471 A | 5/1988 | Takamura et al. |
| 4,807,025 A | 2/1989 | Eino et al. |
| 4,809,680 A | 3/1989 | Yabe |
| 4,816,828 A | 3/1989 | Feher |
| 4,831,456 A | 5/1989 | Takamura |
| 4,832,003 A | 5/1989 | Yabe |
| 4,855,838 A | 8/1989 | Jones et al. |
| 4,858,002 A | 8/1989 | Zobel |
| 4,867,137 A | 9/1989 | Takahashi |
| 4,868,647 A | 9/1989 | Uehara et al. |
| 4,870,488 A | 9/1989 | Ikuno et al. |
| 4,878,112 A | 10/1989 | Ieoka |
| 4,878,113 A | 10/1989 | Nakamura |
| 4,888,639 A | 12/1989 | Yabe et al. |
| 4,890,159 A | 12/1989 | Ogiu |
| 4,971,035 A | 11/1990 | Ito |
| 4,989,586 A | 2/1991 | Furukawa |
| 5,016,098 A | 5/1991 | Cooper et al. |
| 5,021,888 A | 6/1991 | Kondou et al. |
| 5,029,994 A | 7/1991 | Aoki |
| 5,051,824 A | 9/1991 | Nishigaki |
| 5,111,288 A | 5/1992 | Blackshear |
| 5,119,238 A | 6/1992 | Igarashi |
| 5,172,225 A | 12/1992 | Takahashi |
| 5,198,931 A | 3/1993 | Igarashi |
| 5,228,251 A | 7/1993 | Frigan |
| 5,235,965 A | 8/1993 | Hiroya |
| 5,305,121 A | 4/1994 | Moll |
| 5,374,953 A | 12/1994 | Sasaki et al. |
| 5,376,960 A | 12/1994 | Wurster |
| 5,379,756 A | 1/1995 | Pileski et al. |
| 5,392,431 A | 2/1995 | Pfisterer |
| 5,538,497 A | 7/1996 | Hori |
| 5,579,174 A | 11/1996 | Tachihara et al. |
| 5,587,839 A | 12/1996 | Miyano et al. |
| 5,598,205 A | 1/1997 | Nishioka |
| 5,646,788 A | 7/1997 | Bietry |
| 6,282,033 B1 | 8/2001 | Ning |
| 6,744,467 B1 | 6/2004 | Thompson et al. |
| 2001/0036022 A1 | 11/2001 | Takatsuki |

FOREIGN PATENT DOCUMENTS

| | | |
|---|---|---|
| EP | 0 581 286 A1 | 7/1993 |
| JP | 61 006 984 A | 1/1986 |
| JP | 10206922 A | 8/1998 |
| JP | 63 287 176 A | 11/1998 |
| WO | WO 97/11634 A | 3/1997 |

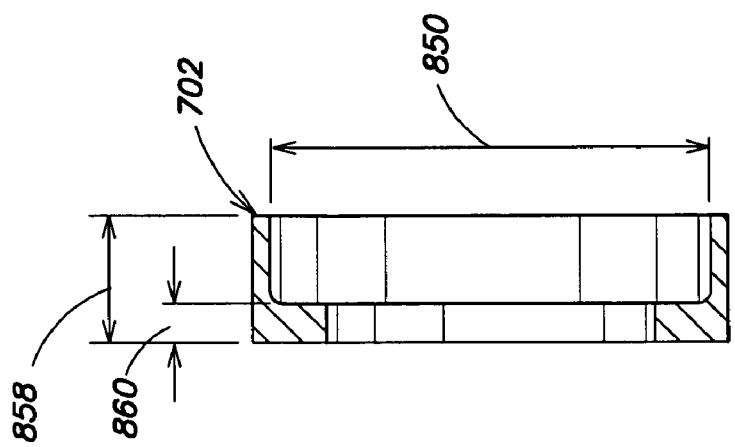
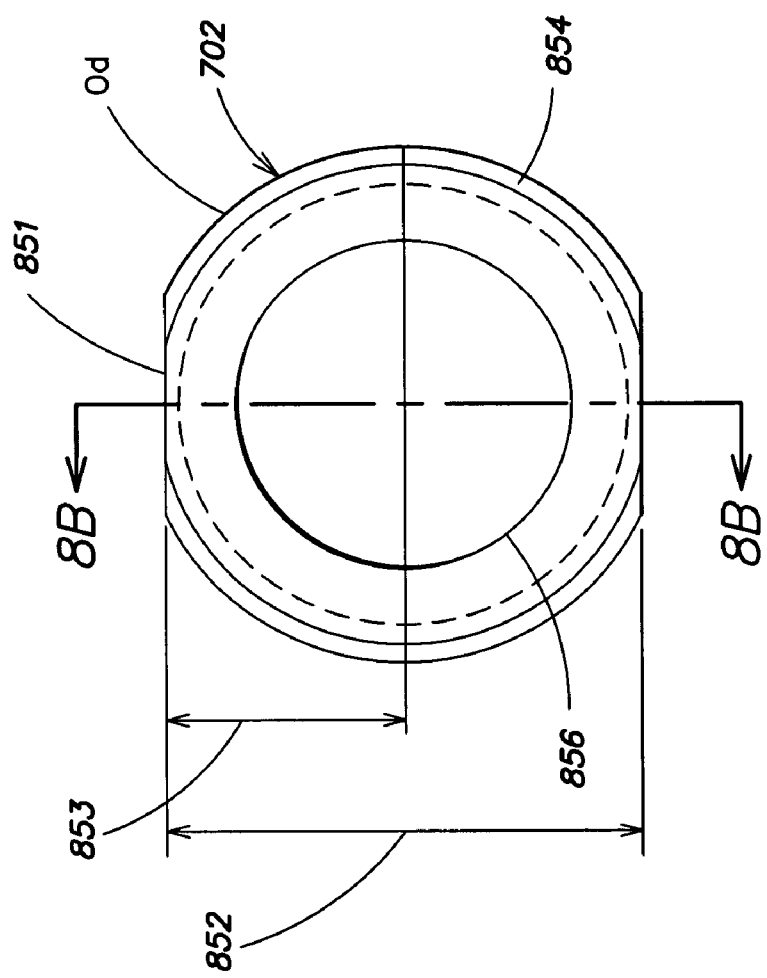
FIG. 8B
FIG. 8A

@Wavelength    0.5876 Microns
Petzval Radius  −704.0739

Seidel Aberration Coefficients in Waves:

| Surf | W040 | W131 | W222 | W220 | W311 | W020 | W111 |
|---|---|---|---|---|---|---|---|
| S1 | 2.063646 | 1.180533 | 0.168834 | 1.737566 | 0.521143 | −2.221268 | −0.635351 |
| S2 | 0.185990 | −1.569347 | 3.310467 | −0.210552 | −6.094979 | −0.667380 | 2.815615 |
| S3 | 0.958762 | 0.674738 | 0.118713 | 3.889814 | 1.389634 | −10.712959 | −3.769676 |
| S4 | −1.116244 | −0.174950 | −0.006855 | −0.928469 | −0.073028 | 11.516959 | 0.902530 |
| S5 | −0.412209 | −1.371710 | −1.141160 | −4.812696 | −8.956968 | 2.121614 | 3.530049 |
| S6 (STOP) | 0.000000 | 0.000000 | 0.000000 | 0.000000 | 0.000000 | 0.000000 | 0.000000 |
| S7 | −3.401465 | 5.243140 | −2.020490 | −4.120822 | 3.954605 | 2.955132 | −2.277573 |
| S8 | 1.611063 | −3.049674 | 1.443226 | 3.261925 | −3.770335 | −2.366120 | 2.239483 |
| S9 | −0.020738 | 0.497832 | −2.987688 | 0.630448 | 10.363169 | 0.404717 | −4.857738 |
| S10 | 0.389379 | −1.507552 | 1.459192 | 0.630448 | −2.632830 | −1.196036 | 2.315337 |
| S11 | −0.077353 | 0.475245 | −0.729958 | 0.000000 | 1.121187 | 0.277620 | −0.852829 |
| S12 | 0.062114 | −0.381622 | 0.586157 | 0.000000 | −0.900314 | −0.222929 | 0.684822 |
| S13 | −0.038423 | 0.236066 | −0.362588 | 0.000000 | 0.556921 | 0.112778 | −0.346446 |
| S14 | 0.023231 | −0.142726 | 0.219222 | 0.000000 | −0.336717 | −0.068186 | 0.209462 |
| IMAGE | 0.000000 | 0.000000 | 0.000000 | 0.000000 | 0.000000 | 0.000000 | 0.000000 |
| TOTAL | 0.227751 | 0.109971 | 0.057072 | 0.077661 | −4.858511 | −0.066057 | −0.042314 |

FIG. 15

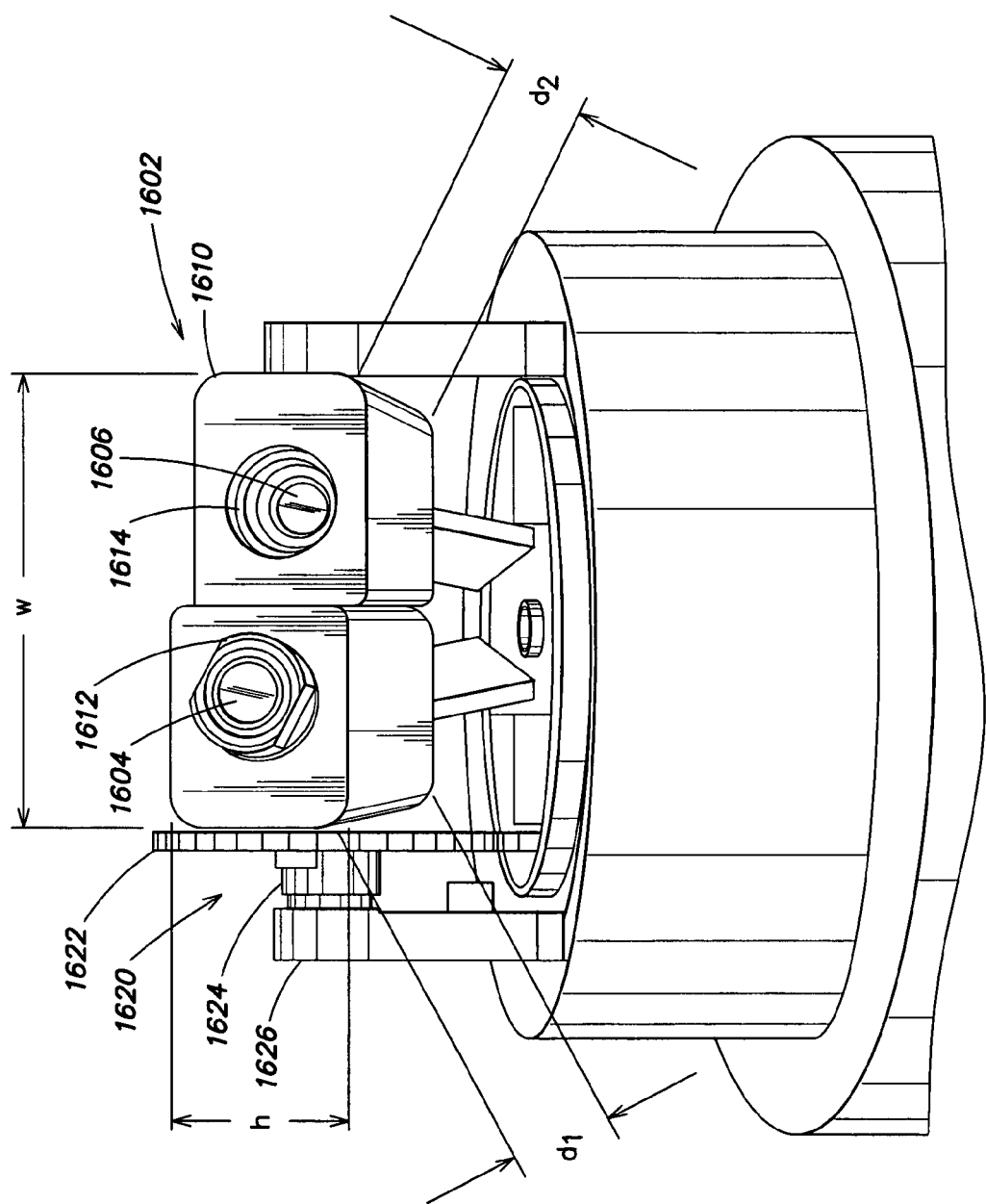

LENS ASSEMBLY AND OPTICAL IMAGING USING SAME

RELATED APPLICATIONS

This application is a continuation-in-part of U.S. application Ser. No. 10/798,841, and claims the benefit under 35 U.S.C. § 120 of U.S. application Ser. No. 10/798,841, entitled "LENS ASSEMBLY AND OPTICAL IMAGING SYSTEM USING SAME," filed on Mar. 11, 2004, which is herein incorporated by reference in its entirety.

BACKGROUND OF INVENTION

1. Field of Invention

The present application relates to lens assemblies for use in optical imaging systems.

2. Discussion of Related Art

Lens assemblies for imaging objects are known. When designing lens assemblies, a designer may take into account one or more desired characteristics or constraints, such as focal length, back focal length, environment, spacing of lenses, aperture size, overall assembly length, field of view, cost and/or ease of manufacture, ease of use, or any other characteristics or design constraints.

However, it is often difficult to design a lens assembly that meets these sometimes competing design constraints, and this difficulty may be compounded when the lens assembly is intended to be used with additional components, or in specific applications. Examples of such additional components may be filters, lens covers, aperture stops, electronic detectors, electronic devices, or any other components. The resulting image quality produced by the lens assembly is often necessarily compromised in order to satisfy these many design constraints, or in order to achieve certain desired optical characteristics.

SUMMARY OF INVENTION

In one aspect, a lens assembly is provided. The lens assembly includes, in order from an object side to an image side: a first lens; a first meniscus lens in optical communication with the first lens; a second meniscus lens in optical communication with the first meniscus lens; an aperture stop in optical communication with the second meniscus lens; a fourth lens in optical communication with the aperture stop; and a bi-convex lens in optical communication with the fourth lens.

In another aspect, a lens assembly is provided and includes a plurality of lenses for producing an image of an object. The plurality of lenses is adapted to provide: a field of view of approximately 15 degrees; approximately 0% vignetting within the field of view; and a distortion of the image of less than approximately 1%.

In yet another aspect, an imaging device for imaging an object is provided. The imaging device includes an imaging device housing and a plurality of individual lens assemblies disposed at least partially within the imaging device housing. A plurality of detectors is disposed at least partially within the imaging device housing. Each detector is optically arranged relative to a respective one of the lens assemblies to receive images from the respective lens assembly.

In yet another aspect, a lens assembly is provided. The lens assembly includes a first lens arrangement comprising at least one lens element having at least one initial parameter; and a second lens arrangement in optical communication with the first lens arrangement. The second lens arrangement comprises at least one lens element having at least one initial parameter. The first and second lens arrangements cooperate to produce an image having an image characteristic within a range of acceptable image characteristics. A first parameter of the at least one initial parameter of the first lens arrangement may be changed while maintaining one or more parameters of the at least one initial parameter of the second lens arrangement within a desired range so that the image characteristic is maintained within the range of acceptable image characteristics.

According to yet another aspect of the invention, a lens system is provided. The lens system comprises a plurality of lens elements, and an aperture stop, each lens element having a lens surface defined by a radius of curvature (r), a thickness (d), an index of refraction (n), and a dispersion (v), the plurality of lens elements being spaced from each other by a distance (d). The lens system satisfies at least one of the following conditions:

a) $0.98*f < d_1+d_2+d_3+d_4+d_5+d_6+d_7+d_8+d_9+d_{10}+d_{11}+d_{12}+d_{13}+d_{14} < 1.02*f$; or b) $0.47*f < d_1+d_2+d_3+d_4+d_5+d_6+d_7+d_8+d_9 < 0.6*f$; or c) $20.4\ mm < f_1 < 30.5\ mm$ when assembly scaled to $f=25\ mm$; or d) $-100\ mm < f_{2,3} < 15\ mm$ when assembly scaled to $f=25\ mm$; or e) $1.49 < n_1 < 1.52$ and $v_1 \wedge 70$; or f) $1.8 < n_2$ and $24 < v_2 < 26$; or g) $-50\ mm < f_4 < -35\ mm$ when $1.5 < n_4 < 1.72$ and when assembly scaled to $f=25\ mm$; or h) $110\ mm < f_5 < 540\ mm$ when $n_5 > 1.7$ and when assembly scaled to $f=25\ mm$; or i) $r_7/r_{10} < 0.3$ when $n_4/n_5 > 0.98$; or j) $r_7/r_{10} > 0.5$ when $n_4/n_5 < 0.90$;

where:

f represents an effective focal length of the plurality of lenses; $f_1$ represents a focal length of a first lens element; $f_4$ represents a focal length of a fourth lens element; $f_5$ represents a focal length of a fifth lens element; $f_{2,3}$ represents a focal length of a combination of a second lens element and a third lens element; $d_1$ represents a thickness of the first lens element; $d_2$ represents a gap distance from an image side surface of the first lens element to an object side surface of the second lens element; $d_3$ represents a thickness of the second lens element; $d_4$ represents a thickness of the third lens element; $d_5$ represents a gap distance from an image side surface of the third lens element to the aperture stop; $d_6$ represents a gap distance from the aperture stop to an object side surface of the fourth lens element; $d_7$ represents a thickness of the fourth lens element; $d_8$ represents a gap distance from an image side surface of the fourth lens element to an object side surface of the fifth lens element; dg represents a thickness of the fifth lens element; $d_{10}+d_{11}+d_{12}+d_{13}+d_{14}$ represents a gap distance from an image side surface of the fifth lens element to an image plane; $n_1$ represents an index of refraction of the first lens element; $n_2$ represents an index of refraction of the second lens element; $n_4$ represents an index of refraction of the fourth lens element; $n_5$ represents an index of refraction of the fifth lens element; $v_1$ represents a dispersion of the first lens element; $v_2$ represents a dispersion of the second lens element; $v_4$ represents a dispersion of the fourth lens element; $v_5$ represents a dispersion of the fifth lens element; $r_7$ represents a radius of curvature of the object side surface of the fourth lens element; and $r_{10}$ represents a radius of curvature of the image side surface of the fifth lens element.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

Various embodiments of the invention will now be described, by way of example, with reference to the accompanying drawings, in which:

FIGS. 8A and 8B illustrate a lens retainer for use in connection with the housing of FIG. 6.

FIG. 15 is an illustrative embodiment of values of aberrations associated with a lens assembly according to an aspect of the present invention.

FIG. 17 is a perspective view of an imaging device including the multi-head imaging device.

DETAILED DESCRIPTION

Figure 1:
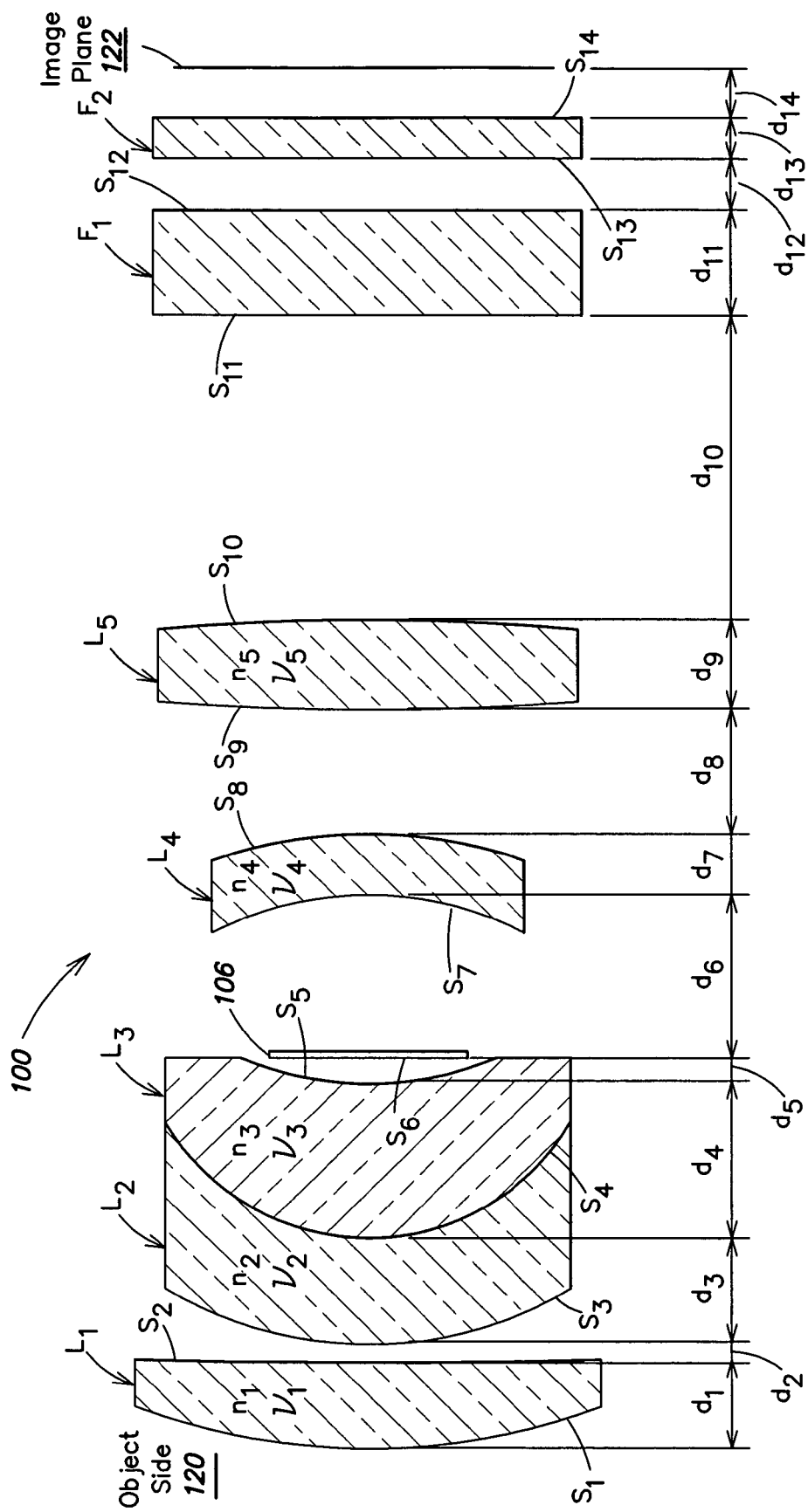
FIG. 1 shows an example of a structure of a lens assembly according to an embodiment of the present invention.

According to aspects of the invention, the lens assembly is constructed to accommodate certain, often competing, design characteristics. In one aspect, the lens assembly provides high optical performance in an easy to manufacture system (e.g., construct, assemble, and align). The lens assembly is also suitable for use in connection with additional components, such as filters and/or electronic detectors, such as CCD's and/or CMOS's.

According to an aspect of the invention, the lens assembly provides a field of view of approximately 15 degrees, with approximately 0% vignetting within the indicated field of view, and with less than approximately 1% distortion of an image. The approximately 15 degree field of view may range from 14.5 degrees to 15.5 degrees. In one embodiment, the lens assembly provides these performance characteristics in conjunction with a high speed aperture, for example, approximately f4. The lens assembly may be a moderate telephoto lens assembly, wherein it may be constructed to provide a ratio of the length of the lens assembly to the focal length of approximately 1.0.

According to another aspect of the invention, the lens assembly includes an aperture stop, with the lens assembly being non-symmetrical about the aperture stop. According to one embodiment, the non-symmetrical lens assembly includes four lens groups and five lens elements. The second and third lens elements, constituting the second lens group, have highly sensitive design parameters in comparison to the design parameters of the first, fourth, and fifth lens elements. Thus, the second and third lens elements have tighter manufacturing tolerances as compared to the other lens elements. The aperture stop may be disposed between the third and fourth lenses.

In one embodiment, the second lens group includes second and third lens elements, cemented together. The second and third lens elements consistently take the form of meniscus lenses. The fourth lens group includes a fifth lens element. The fifth lens element consistently takes the form of a bi-convex lens element. The fifth lens element may have approximately equal but opposite radii of curvature for a surface proximate the object side of the lens assembly and a surface distal the object side of the lens assembly, respectively, which may be termed in the art as a "perfect" lens element. The first lens group includes a first lens element, that may be either a meniscus lens element having a convex surface proximate the object side of the lens assembly, and a concave surface distal the object side of the lens assembly, or a plano-convex lens, having a convex surface proximate the object side of the lens assembly and a planar surface distal the object side of the lens assembly. The third lens group includes a fourth lens element, that may be either a meniscus lens element having a concave surface proximate the object side and a convex surface distal the object side, or a bi-concave lens, having concave surfaces proximate and distal the object side of the lens assembly. In one embodiment, the above-listed lens elements are immediately adjacent each other. In one embodiment, an aperture stop (also referred to as aperture plate, aperture, stop, or micro-plate) is disposed between the second and third lens groups, and in one embodiment, between the third and fourth lens elements. In another embodiment, the aperture stop is disposed between the third and fourth lens elements, with the other lens elements being immediately adjacent each other.

The lens assembly may also incorporate filter plates, while maintaining a high quality image. The filter plates may be low-pass filter plates, color correction plates, or any other type of filter plate. In one embodiment, one or more parallel filter plates having planar surfaces may be disposed between the fifth lens element and the image plane. Such filter plates often produce aberrations, such as coma and astigmatism, or other aberrations, in the resulting image of the object. An aspect of the present invention provides correction for such coma and astigmatism, or other aberrations, introduced by using plane parallel plates with a lens assembly. According to one embodiment, the lens assembly contains compensating aberrations to compensate the aberrations of plane parallel plates.

According to another aspect of the invention, a multi-head imaging device is provided. The multi-head imaging device includes two distinct lens assemblies that may be identical to each other or different from each other. The multi-head imaging device may further comprise two distinct CCD detectors, or other types of detectors (e.g., CMOS detectors), or imaging media, or any suitable combination of detectors or imaging media. The two distinct lens assemblies may each be associated with at least one of the two distinct detectors and/or imaging media.

According to one embodiment, a user may view an image provided by one of the two distinct lens assemblies. The user may choose which lens assembly through which to view an object and may switch lens assemblies through which to view the object, as desired. Thus, a user may manually switch between lens assemblies. Alternatively or in addition, switching between views may occur automatically and may be programmed or controlled by software. In one embodiment, switching between lens assemblies may occur in response to an event (which may be a programmed event or a detected event). In one embodiment, switching between lens assemblies may occur upon motion occurring in the field of view or a predetermined object in or entering the field of view. In one embodiment, switching between views may occur instantaneously.

Although certain embodiments are described as including only two lens assemblies, the present invention is not limited in this respect, as additional lens assemblies may be provided in a multi-lens assembly head.

According to one embodiment, a first lens assembly in the multi-lens assembly head is a constant focus lens assembly. A second lens assembly is a wide-angle lens assembly. According to one embodiment, the image produced by the wide-angle lens assembly is generally viewed, and the image produced by the constant focus lens assembly is used to provide a magnified view of a point or object of interest in the field of view of the wide-angle lens assembly. Of course, the opposite may hold, as the present invention is not limited in this respect. For example, a viewer may first view an object through a relatively higher-magnification lens and then switch to a wider field of view lens.

According to another aspect of the invention, the lens assembly is of a miniature and compact design, which may find suitable use as a security camera, an inspection camera, or as a personal use camera, as will be discussed in more detail below.

The above aspects of the invention may be employed singularly or in any suitable combination as the present invention is not limited in this respect. Also, any or all of the above aspects may be employed in a relatively small imaging system; however, the present invention is not limited in this respect, as aspects of the invention may be used on any type of imaging system, including those that may be larger or smaller than the embodiments described. In addition, the lens assembly may be employed in any device and may be employed with any type of camera, including digital or film-based cameras. Various aspects and embodiments of the invention will now be described in more detail with respect to the accompanying figures. The invention is not, however, limited to the aspects and embodiments shown. In some of the figures that follow, specific numerical values are used to describe the elements and/or optical parameters. It should be appreciated that such values are not necessarily limiting, but rather, that the values may fall within a range of acceptable limits.

In the following description, radii of curvature are listed for several surfaces of lens elements. As is conventional, the radii will be listed with a positive value when the surface bows toward an object side of the lens, and with a negative value when the surface bows toward an image side of the lens. The specific numbers that follow relate to lens assemblies designed with a specific focal length. It should be appreciated that the values will differ if the lens assemblies are scaled to a different focal length. Such scaling of components is meant to be encompassed within the present invention.

FIG. 1 shows one embodiment of a lens assembly according to the present invention. The lens assembly 100 comprises five lenses, $L_1$–$L_5$, an aperture stop 106 and two planar plates, $F_1$ and $F_2$, all disposed between an object side 120 and an image plane 122. As illustrated, and discussed below in more detail, lenses $L_1$–$L_3$ in this embodiment are meniscus lenses having positive radii of curvature. Lens $L_4$ is a meniscus lens having negative radii of curvature. Lens $L_5$ is a bi-convex lens.

The aperture stop 106, having a surface $S_6$, is disposed between lens $L_3$ and lens $L_4$. In this embodiment, the aperture stop is a fixed aperture stop, and may have a high speed, for example, f4. Other aperture stop f-numbers may be used, as the present invention is not limited in this respect. Further, although in this embodiment, the aperture stop is fixed, the present invention is not limited in this respect, as variable or changeable (i.e., replaceable) aperture stops may be employed.

Planar plates $F_1$ and $F_2$ may be any planar plates, as is known to those of skill in the art, and the invention is not limited in this respect. For example, planar plate $F_1$ may be a filter plate, such as a low-pass filter plate, or any other type of filter plate. Planar plate $F_2$ may be cover glass, used to cover a detector located at the image plane 122.

The introduction of planar parallel plates, such as $F_1$ and $F_2$ in FIG. 1, into an optical system may introduce aberrations into the system. However, such planar plates may be necessary for use with CCD or CMOS devices. A lens assembly which is designed in the absence of planar plates may suffer performance degradation if one or more planar plates are subsequently inserted into the assembly. It may be necessary to design the lens assembly to compensate for such aberrations, in order to ensure that a satisfactory image quality may result with the use of the planar plates. Thus, according to one aspect of the invention, as will be described in more detail below, the combination of lenses $L_1$–$L_5$ compensates for any aberrations introduced by the planar parallel plates $F_1$ and $F_2$.

The lenses of the lens assembly 100 according to the present embodiment are now described in more detail in connection with FIGS. 2–6. The specific values listed in connection with FIGS. 2–6 pertain to the lens assembly 100 when scaled for use with a ½ inch CCD detector located at the image plane 122. The focal length, f, of a lens assembly scaled for use with a ½ inch CCD detector is approximately 29.9 mm. The specific values listed in connection with FIGS. 2–6 may change if the lens assembly 100 were scaled for use with a different device and/or detector, as would be known to one of skill in the art. Such scaling is meant to be encompassed by the present invention.

Figure 2:
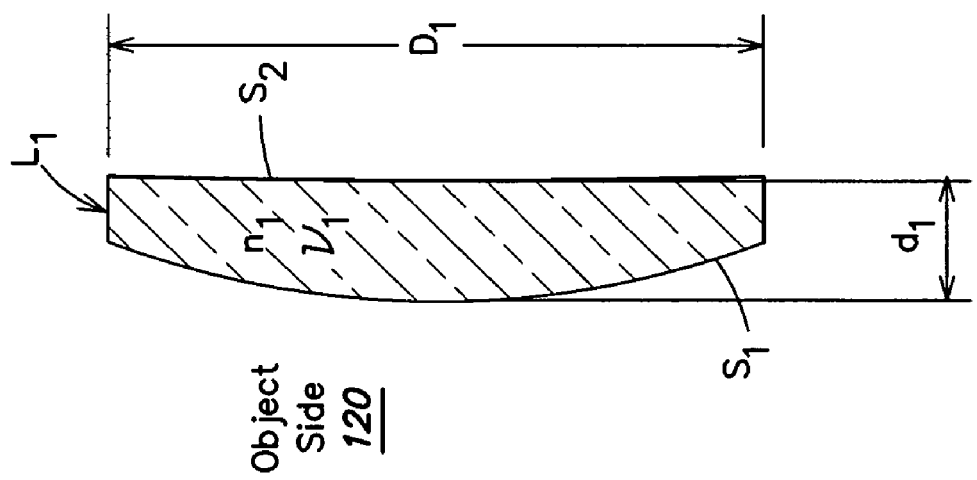

As shown in FIG. 2, lens $L_1$ has a surface $S_1$ proximate the object side 120 and a surface $S_2$ distal the object side. In this embodiment, surface $S_1$ has a radius of curvature of approximately 12.6 mm, while surface $S_2$ has a radius of curvature of approximately 72.95 mm. Surfaces $S_1$ and $S_2$ are both coated with approximately 0.5876 μm of anti-reflective coating (hereinafter Ar, or AR), as would be known to one of skill in the art, although other suitable coatings (or no coating at all) may be employed, as the present invention is not limited in this respect. The thickness, $d_1$, of lens $L_1$ is approximately 1.83 mm. Lens $L_1$ also has a circular diameter $D_1$ of approximately 10 mm. The index of refraction, $n_1$, is approximately 1.487, while the dispersion, $v_1$, is approximately 84.47. Lens $L_1$ is a crown glass. It should be appreciated that the present invention is not limited in this respect, as other suitable materials and/or other suitable indices of refraction and/or dispersion may be employed.

Figure 3:
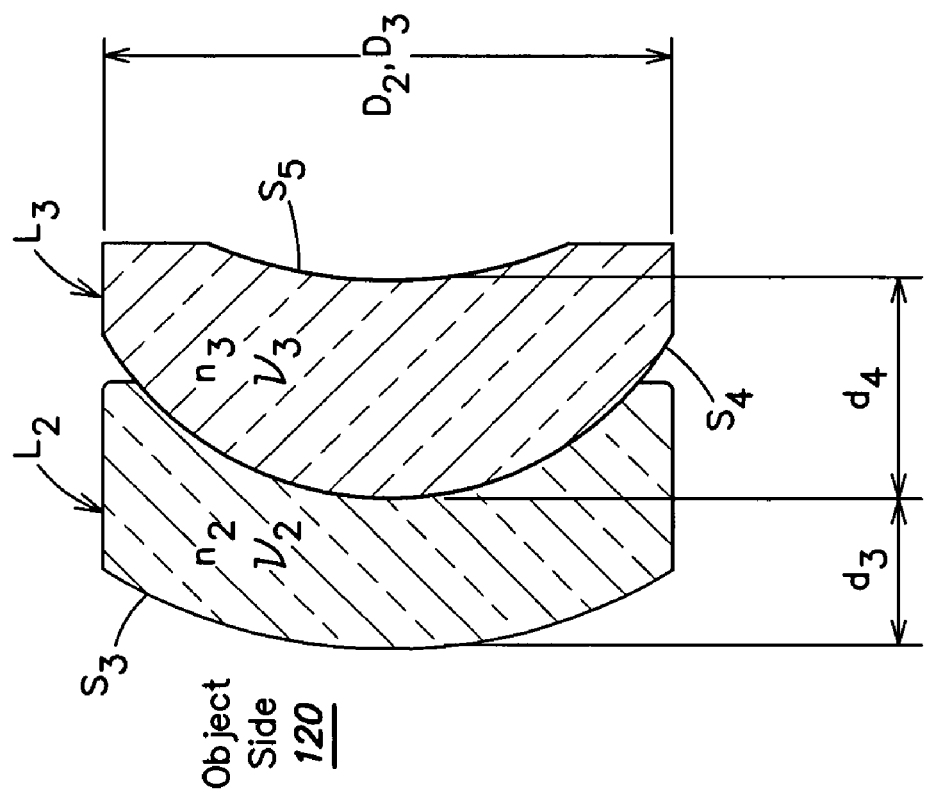
FIGS. 2–5 illustrate lenses of a lens assembly according to the present invention.

FIG. 3 illustrates lenses $L_2$ and $L_3$ of FIG. 1. Surface $S_3$ of lens $L_2$ is proximate the object side 120 and has a radius of curvature of approximately 8.45 mm. Lenses $L_2$ and $L_3$ share a common surface $S_4$, which in this embodiment has a radius of curvature of approximately 5 mm. The thickness $d_3$ of lens $L_2$ is approximately 2.33 mm. Lens $L_2$ is circular with a diameter $D_2$ of approximately 8.5 mm. Lens $L_2$ has an index of refraction, $n_2$, of approximately 1.805 and a dispersion, $v_2$, of approximately 25.43. Lens $L_2$ is a flint glass. It should be appreciated that the present invention is not limited in this respect, as other suitable materials and/or other suitable indices of refraction and/or dispersion may be employed.

Lens $L_3$ has a surface $S_5$ with a radius of curvature of approximately 5.9 mm, such that the thickness $d_4$ of lens $L_3$ is approximately 3.08 mm. Lens $L_3$ also has a circular diameter $D_3$ of approximately 8.5 mm. Lens $L_3$ has an index of refraction, $n_3$, of approximately 1.620 and a dispersion, $v_3$, of approximately 60.32. Lens $L_3$ is a crown glass. It should be appreciated that the present invention is not limited in this respect, as other suitable materials and/or other suitable indices of refraction and/or dispersion may be employed.

Surface $S_3$ of lens $L_2$, and surface $S_5$ of lens $L_3$ are coated with approximately 0.5876 μm of Ar, although other suitable coatings (or no coating at all) may be employed, as the present invention is not limited in this respect. It is also seen in FIG. 3 that lenses $L_2$ and $L_3$ are cemented together. This may be accomplished by any suitable means, for example, UV epoxy.

Figure 4:
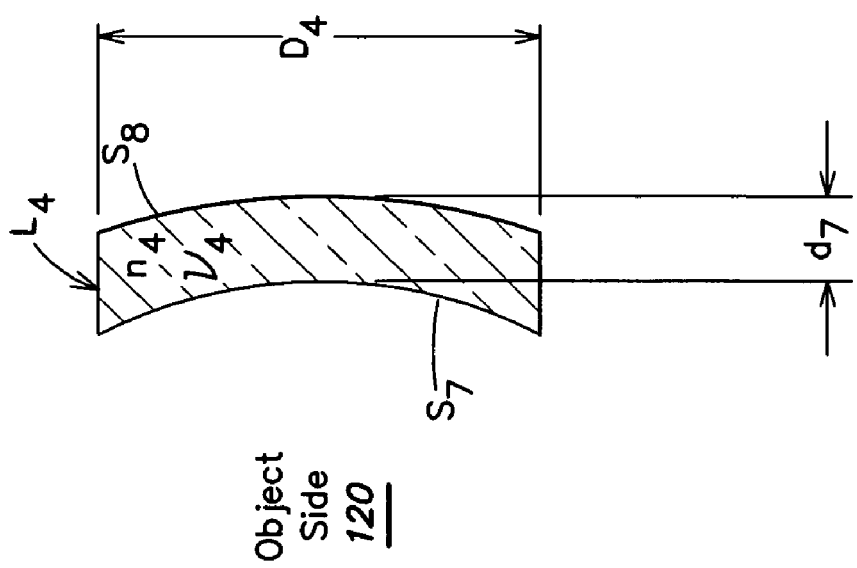

FIG. 4 illustrates lens $L_4$ of lens assembly 100. Lens $L_4$ has a surface $S_7$ proximate the object side 120 and a surface $S_8$ distal the object side. In this embodiment, surface $S_7$ has a radius of curvature of approximately −6.9 mm, while surface $S_8$ has a radius of curvature of approximately −8.55 mm. Surfaces $S_7$ and $S_8$ are both coated with approximately 0.5876 μm of Ar, although other suitable coatings (or no coating at all) may be employed, as the present invention is not limited in this respect. The thickness, $d_7$, of lens $L_4$ is approximately 1.24 mm. Lens $L_4$ also has a circular diameter $D_4$ of approximately 6 mm. Lens $L_4$ has an index of refraction, $n_4$, of approximately 1.717, while the dispersion, $v_4$, is approximately 47.96. Lens $L_4$ is a crown glass. It should be appreciated that the present invention is not limited in this respect, as other suitable materials and/or other suitable indices of refraction and/or dispersion may be employed.

Figure 5:
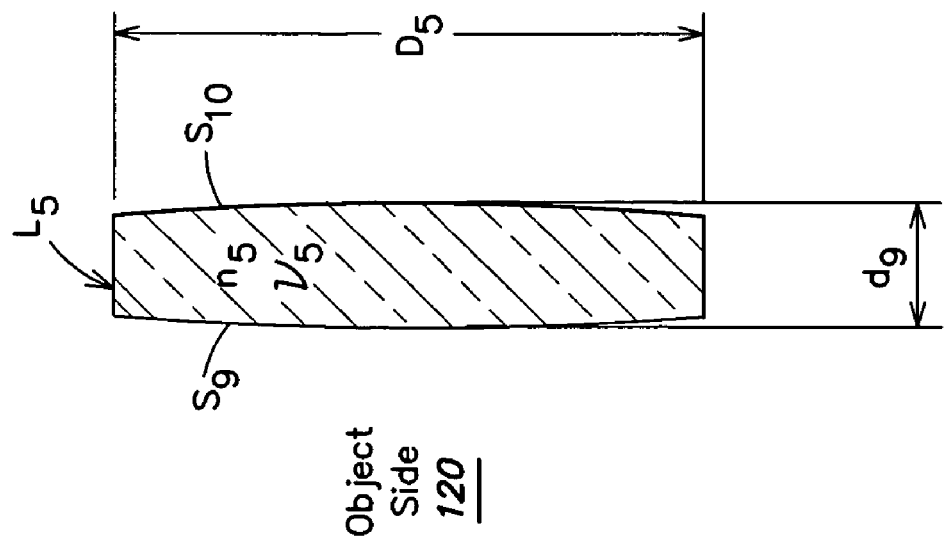

FIG. 5 illustrates lens $L_5$ of lens assembly 100. Lens $L_5$ has a surface $S_9$ proximate the object side 120 and a surface $S_{10}$ distal the object side. In this embodiment, surface $S_9$ has a radius of curvature of approximately 50 mm, while surface $S_{10}$ has a radius of curvature of approximately −50 mm. Thus, lens $L_5$, in this embodiment, is a bi-convex lens and may be considered a perfect bi-convex lens. Surfaces $S_9$ and $S_{10}$ are both coated with approximately 0.5876 μm of Ar, although other suitable coatings (or no coating at all) may be employed, as the present invention is not limited in this respect. The thickness, $d_9$, of lens $L_5$ is approximately 1.47 mm. Lens $L_5$ also has a circular diameter $D_5$ of approximately 8 mm. The index of refraction, $n_5$, is approximately 1.744, while the dispersion, $v_5$, is approximately 44.72. Lens $L_5$ is a crown glass. It should be appreciated that the present invention is not limited in this respect, as other suitable materials and/or other suitable indices of refraction and/or dispersion may be employed.

Referring again to FIG. 1, it may be necessary to control the distances between elements of the lens assembly 100. The distance between surface $S_2$ of lens $L_1$ and surface $S_3$ of lens $L_2$ is designated by $d_2$. The distance between surface $S_5$ of lens $L_3$ and surface $S_6$ of aperture stop 106 is designated by $d_5$. The distance from surface $S_6$ of aperture stop 106 to surface $S_7$ of lens $L_4$ is designated by $d_6$. The distance from surface $S_8$ of lens $L_4$ to surface $S_9$ of lens $L_5$ is designated by $d_8$. The distance from surface $S_{10}$ of lens $L_5$ to surface $S_{11}$ of planar plate $F_1$ is designated by $d_{10}$. The distance from surface $S_{12}$ of planar plate $F_1$ to surface $S_{13}$ of planar plate $F_2$ is designated by $d_{12}$. The distance from surface $S_{14}$ of planar plate $F_2$ to the image plane 122 is represented by $d_{14}$. Such distances are listed, for example, in Table 3.

Figure 6:
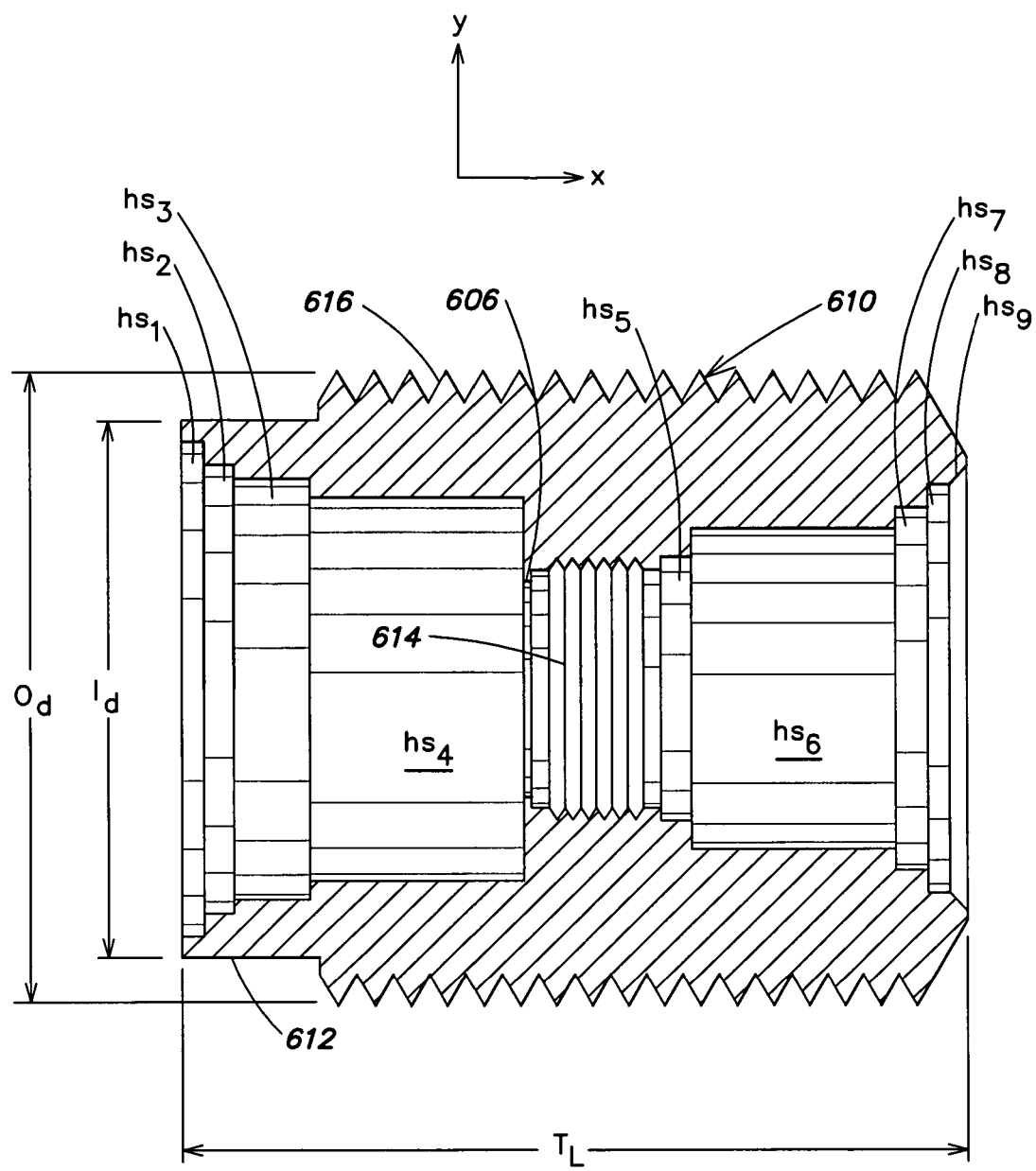
FIG. 6 illustrates an example of a housing for holding lenses of a lens assembly according to the present invention.

According to one aspect of the invention a housing may be provided to hold the lenses and aperture stop of the lens assembly 100, and to ensure that the values of $d_2$, $d_5$, $d_6$, and $d_8$ are maintained appropriately. FIG. 6 shows an example of a side view of a housing 610 in the absence of the lenses $L_1$–$L_5$.

In one embodiment, as shown in FIG. 6, the housing 610 contains housing steps $hs_1$–$hs_9$. The housing steps are formed in the housing for the purpose of receiving the lenses $L_1$–$L_5$ and ease the process of assembling the lenses $L_1$–$L_5$. Each housing step has a thickness, measured in the x-direction. The housing 610 is also circular, into and out of the page, so that each housing step has a diameter, measured in the y-direction. The approximate values of the housing step thicknesses and diameters are shown in Table 1. Note that in some instances the housing step has a variable diameter (i.e., is tapered) in which case the minimum diameter is listed. The total length $T_L$ of the housing is approximately 16.1 mm and the outer thread diameter $O_d$ is approximately 14 mm. The non-threaded diameter Id of the housing at the portion 612 is approximately 12 mm. It should be appreciated that the dimensions of the housing are non-limiting.

TABLE 1

Housing Step Sizes For FIG. 6

| Housing Step | Step Thickness (mm) | Step Diameter (mm) |
|---|---|---|
| $hs_1$ | 0.43 | 11.00 |
| $hs_2$ | 0.64 | 10.02 |
| $hs_3$ | 1.69 | 9.50 |
| $hs_4$ | 4.5 | 8.52 |
| $hs_5$ | 0.62 | 6.02 |
| $hs_6$ | 4.32 | 7.11 |
| $hs_7$ | 0.63 | 8.02 |
| $hs_8$ | 0.47 | 9.00 |
| $hs_9$ | 0.35 | 9.00* |

*The listed value corresponds to the minimum diameter of the housing step.

The housing 610 may be formed with threads 616 to allow the housing to be threaded in and held relative to another component, such as a camera housing. Specifically, an outer surface of the housing has threads. In one embodiment, the housing is formed with an M14 thread, having, e.g., an outer diameter of approximately 14.0 mm and a pitch diameter of approximately 13.5 mm. Of course, other suitable thread configurations or other suitable attaching arrangements may be employed, as the present invention is not limited in this respect. The housing also has a non-threaded portion 612 of the outer surface to mate to a lens retainer, as described below in connection with FIGS. 8A and 8B.

In the illustrated embodiment a fixed aperture stop 606 is provided. The aperture stop is an f4 stop with a diameter of approximately 4.52 mm. The thickness of the stop is approximately 0.2 mm. In another embodiment the aperture stop may be variable. In another embodiment, the aperture stop may be provided by micro-plates that may take one of several sizes, with the micro-plate being held in the housing by any suitable mechanism. In one embodiment, the micro-plate may be held by at least one of the lens elements.

The housing 610 may be formed with threads 616 to allow the housing to be threaded in and held relative to another component, such as a camera housing. Specifically, an outer surface of the housing has threads. In one embodiment, the housing is formed with an M14 thread, having, e.g., an outer diameter $O_d$ of approximately 14.0 mm and a pitch diameter of approximately 13.5 mm. Of course, other suitable thread configurations or other suitable attaching arrangements may be employed, as the present invention is not limited in this respect. The housing also has a non-threaded portion 612 of the outer surface to mate to a lens retainer, as described below in connection with FIGS. 8A and 8B.

In one embodiment, the housing 610 is formed of metal. However, it should be appreciated that the housing could be formed out of any material, including plastics, ceramics, or any other type of material, as the invention is not limited in this regard.

Figure 7:
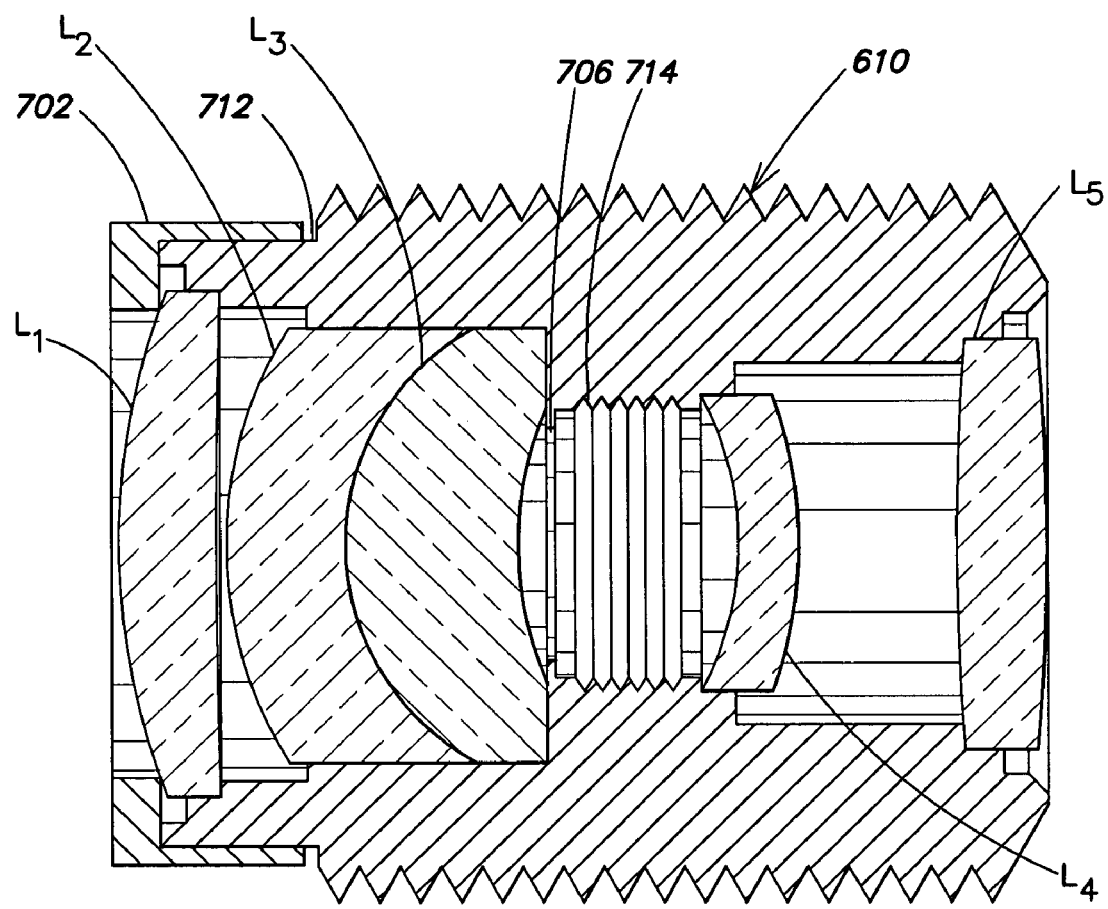
FIG. 7 illustrates the housing of FIG. 6 with lenses of a lens assembly according to the present invention.

FIG. 7 shows the housing 610 of FIG. 6 with the lenses $L_1$–$L_5$ of FIG. 1 disposed in the housing steps. Lens $L_1$ is disposed in housing step $hs_2$. Lenses $L_2$ and $L_3$ are disposed in housing step $hs_4$, which abuts the aperture stop 706. Lens $L_4$ is disposed in $hs_5$. Lens $L_6$ is disposed in $hs_7$. The lenses may fit snugly into the housing steps, or may be fixed within the housing steps by any suitable arrangement, for example, glue. By using the step locations in the housing, the lenses are spaced appropriately to ensure proper function of the lens assembly. The distances $d_2$, $d_5$, $d_6$, and $d_8$ are maintained at appropriate values.

To hold lens $L_1$ in place, in one embodiment as shown in FIG. 7, a lens retainer 702 is mated to the non-threaded portion 712 of the housing. The lens retainer 702 may be attached to the housing body using any suitable arrangement, such as welding, adhesively bonding, threading, interference fitting (e.g., press or shrink fitting), etc. as the present invention is not limited in this respect. The lens retainer 702 is illustrated in FIGS. 8A and 8B. FIG. 8A shows a front-on view of the lens retainer 702. FIG. 8B is a side view of the lens retainer 702. As shown in FIG. 8B, the lens retainer has an inner mating surface with a diameter 850 of approximately 12 mm for example, 12.02 mm, allowing it to mate with the non-threaded portion 712 of housing 610. The lens retainer has a thickness 858 that is approximately 3.5 mm. The end of the lens retainer has an end thickness 860 that is approximately 1.0 mm.

To facilitate installing the housing to another component, the housing may be formed with wrench flats. In one embodiment, the wrench flats are formed on the housing itself. In anther embodiment, the wrench flats 851 are formed on the retainer. Thus, when the lens retainer 702 is mated to the non-threaded portion 712 of housing 610, the wrench flats facilitate threading the housing to the other component. The width 852 across the wrench flats 851 is approximately 13 mm; the distance 853 from the center of the retainer 702 to the wrench flats 851 is approximately 6.5 mm. The retainer 702 may have an edge 854 that has a chamfer of approximately 45 degrees for approximately 0.5 mm. Other suitable arrangements to facilitate threading the housing, such as, e.g., spanner wrench slots may be employed, as the present invention is not limited in this respect. The lens retainer has an inner diameter 856 of approximately 9 mm.

Until this point, the discussion of the lenses in FIGS. 2–6 has pertained to an embodiment in which the lens assembly 100 is scaled for use with a ½ inch CCD detector. However, as mentioned, the lens assembly may be scaled for use with other components, detectors, filter plates, or for any other reason, and in general the lens assembly 100 may be scaled to any desired focal length. As an example, the lens assembly 100 may be scaled for use with a ⅓ inch CCD detector, as opposed to the ½ inch CCD detector described thus far. In this embodiment, the lens assembly may be scaled to a focal length, f, of approximately 22.4 mm. The values for radii of curvature, index of refraction, dispersion, and spacing of elements may need to change to adapt the design to provide the desired optical performance with the ⅓ inch CCD detector. The following description of the lenses in FIGS. 2–6 pertains to an embodiment in which the lens assembly 100 is scaled for use with a ⅓ inch CCD detector.

In this embodiment, surface $S_1$ has a radius of curvature of approximately 10.3 mm, while surface $S_2$ has a radius of curvature of approximately 85 mm. Surfaces $S_1$ and $S_2$ are both coated with approximately 0.5876 μm of Ar, although other suitable coatings (or no coating at all) may be employed, as the present invention is not limited in this respect. The thickness, $d_1$, of lens $L_1$ is approximately 1.4 mm. Lens $L_1$ also has a circular diameter $D_1$ of approximately 7.5 mm. The index of refraction, $n_1$, is approximately 1.487, while the dispersion, $v_1$, is approximately 84.47. Lens $L_1$ is a crown glass. It should be appreciated that the present invention is not limited in this respect, as other suitable materials and/or other suitable indices of refraction and/or dispersion may be employed.

In this embodiment, surface $S_3$ of lens $L_2$ has a radius of curvature of approximately 6.27 mm. Common surface $S_4$ in this embodiment has a radius of curvature of approximately 3.72 mm. Thus, the thickness $d_3$ of lens $L_2$ is approximately 1.73 mm. Lens $L_2$ is circular with a diameter $D_2$ of approximately 6.5 mm. Lens $L_2$ has an index of refraction, $n_2$, of approximately 1.805 and a dispersion, $v_2$, of approximately 25.36. Lens $L_2$ is a flint glass. It should be appreciated that the present invention is not limited in this respect, as other suitable materials and/or other suitable indices of refraction and/or dispersion may be employed.

Lens $L_3$ has a surface $S_5$ with a radii of curvature of approximately 4.35 mm, such that the thickness $d_4$ of lens $L_3$ is approximately 2.6 mm. Lens $L_3$ also has a circular diameter $D_3$ of approximately 6.5 mm. Lens $L_3$ has an index of refraction, $n_3$, of approximately 1.620 and a dispersion, $v_3$, of approximately 60.32. Lens $L_3$ is a crown glass. It should be appreciated that the present invention is not limited in this respect, as other suitable materials and/or other suitable indices of refraction and/or dispersion may be employed.

Surface $S_3$ of lens $L_2$, and surface $S_5$ of lens $L_3$ are coated with approximately 0.5876 μm of Ar, although other suitable coatings (or no coating at all) may be employed, as the present invention is not limited in this respect. It is also seen in FIG. 3 that lenses $L_2$ and $L_3$ are cemented together. This may be accomplished by any suitable means, for example, UV epoxy.

In this embodiment, lens $L_4$ of FIG. 4 has a surface $S_7$ having a radius of curvature of approximately −5.541 mm, while surface $S_8$ has a radius of curvature of approximately −7.0 mm. Surfaces $S_7$ and $S_8$ are both coated with approximately 0.5876 μm of Ar, although other suitable coatings (or no coating at all) may be employed, as the present invention is not limited in this respect. The thickness, $d_7$, of lens $L_4$ is approximately 1.00 mm. Lens $L_4$ also has a circular diameter $D_4$ of approximately 5 mm. Lens $L_4$ has an index of refraction, $n_4$, of approximately 1.717, while the dispersion, $v_4$, is approximately 47.96. Lens $L_4$ is a crown glass. It should be appreciated that the present invention is not limited in this respect, as other suitable materials and/or other suitable indices of refraction and/or dispersion may be employed.

In this embodiment, surface $S_9$ of lens $L_5$ has a radius of curvature of approximately 37 mm. Surface $S_{10}$ has a radius of curvature of approximately −37 mm. Thus, lens $L_6$ in this embodiment is a bi-convex lens and may be considered a perfect bi-convex lens. Surfaces $S_9$ and $S_{10}$ are both coated with approximately 0.5876 μm of Ar, although other suitable coatings (or no coating at all) may be employed, as the present invention is not limited in this respect. The thickness, $d_9$, of lens $L_5$ is approximately 1.50 mm. Lens $L_5$ also has a circular diameter $D_5$ of approximately 6.5 mm. The index of refraction, $n_5$, is approximately 1.744, while the dispersion, $v_5$, is approximately 44.72. Lens $L_5$ is a crown glass. It should be appreciated that the present invention is not limited in this respect, as other suitable materials and/or other suitable indices of refraction and/or dispersion may be employed.

In this embodiment, the housing 610 may no longer be adequate to hold the lenses $L_1$–$L_5$. Therefore, a housing 910 may be provided, as shown in FIG. 9, which is a cross-section view of housing 910 in the absence of lenses $L_1$–$L_5$.

In one embodiment, the housing 910 includes housing steps $hs_{10}$–$hs_{22}$. The housing steps are formed in the housing for the purpose of receiving the lenses $L_1$–$L_5$, and ease the process of assembling the lenses $L_1$–$L_5$. Each housing step has a thickness, measured in the x-direction. The housing 910 is also circular, into and out of the page, so that each housing step has a diameter, measured in the y-direction. The approximate values of the housing step thicknesses and diameters are shown in Table 2. Note that in some instances the housing step has a variable diameter (i.e., is tapered) in which case the minimum diameter is listed. The total length $T_L$ of the housing is approximately 14.3 mm and the outer diameter $O_d$ is approximately 9.5 mm. It should be appreciated that the dimensions of the housing are non-limiting.

TABLE 2

Figure 9:
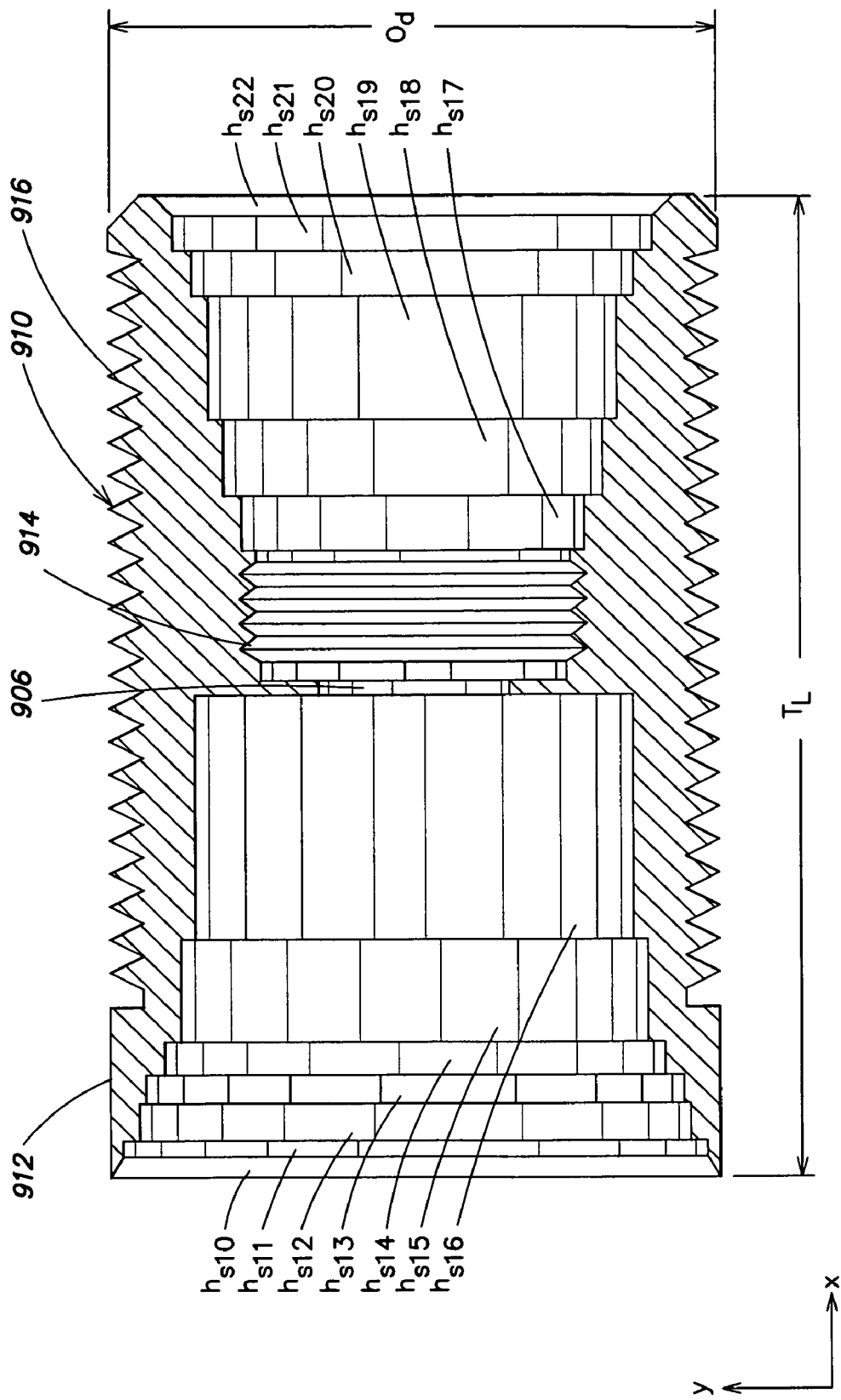
FIG. 9 illustrates an example of a housing for holding lenses of a lens assembly according to the present invention.

Housing Step Sizes For FIG. 9

| Housing Step | Step Thickness (mm) | Step Diameter (mm) |
|---|---|---|
| $hs_{10}$ | 0.25 | 8.75* |
| $hs_{11}$ | 0.25 | 8.75 |
| $hs_{12}$ | 0.60 | 8.22 |
| $hs_{13}$ | 0.40 | 8.00 |
| $hs_{14}$ | 0.50 | 7.52 |
| $hs_{15}$ | 1.50 | 7.00 |
| $hs_{16}$ | 3.50 | 6.52 |
| $hs_{17}$ | 0.79 | 5.02 |
| $hs_{18}$ | 1.15 | 5.50 |
| $hs_{19}$ | 1.84 | 6.00 |
| $hs_{20}$ | 0.66 | 6.52 |
| $hs_{21}$ | 0.50 | 7.00 |
| $hs_{22}$ | 0.30 | 7.00* |

*The listed value corresponds to the minimum diameter of the housing step.

As with housing 610, housing 910 may be formed with threads 916 to allow the housing to be threaded in and held relative to another component, such as a camera housing. Specifically, an outer surface of the housing has threads. In one embodiment, the housing is formed with an M9 thread, having, e.g., an outer diameter of approximately 8.9 mm and a pitch diameter of approximately 8.6 mm. Of course, other suitable thread configurations or other suitable attaching arrangements may be employed, as the present invention is not limited in this respect. Wrench flats 912 may be formed along the length of the housing, or as shown, along a portion of the housing to facilitate threading the housing to the other component. The width across the wrench flats is approximately 9 mm. Other suitable arrangements to facilitate threading the housing, such as, e.g., spanner wrench slots may be employed, as the present invention is not limited in this respect.

In the illustrated embodiment a fixed aperture stop 906 is provided. The aperture stop is an f4 stop with a diameter of approximately 3 mm. The thickness of the stop is approximately 0.2 mm. In another embodiment the aperture stop may be variable. In another embodiment, the aperture stop may be provided by micro-plates that may take one of several sizes, with the micro-plate being held in the housing by any suitable mechanism. In one embodiment, the micro-plate may be held by at least one of the lens elements.

The housing 910 also has a anti-halation thread region 914 of approximately 1.86 mm in thickness and 4.5 mm in diameter. The anti-halation region may be formed as threads and functions to alter the reflection of light within the housing from what it would otherwise be if the threading were not provided, i.e., from a flat surface. This affords certain optical benefits, such as reduced ghosting. Other arrangements for reducing reflections may be employed, as the present invention is not limited in this respect.

In one embodiment, the housing 910 is formed of metal. However, it should be appreciated that the housing could be formed out of any material, including plastics, ceramics, or any other type of material, as the invention is not limited in this regard.

Figure 10:
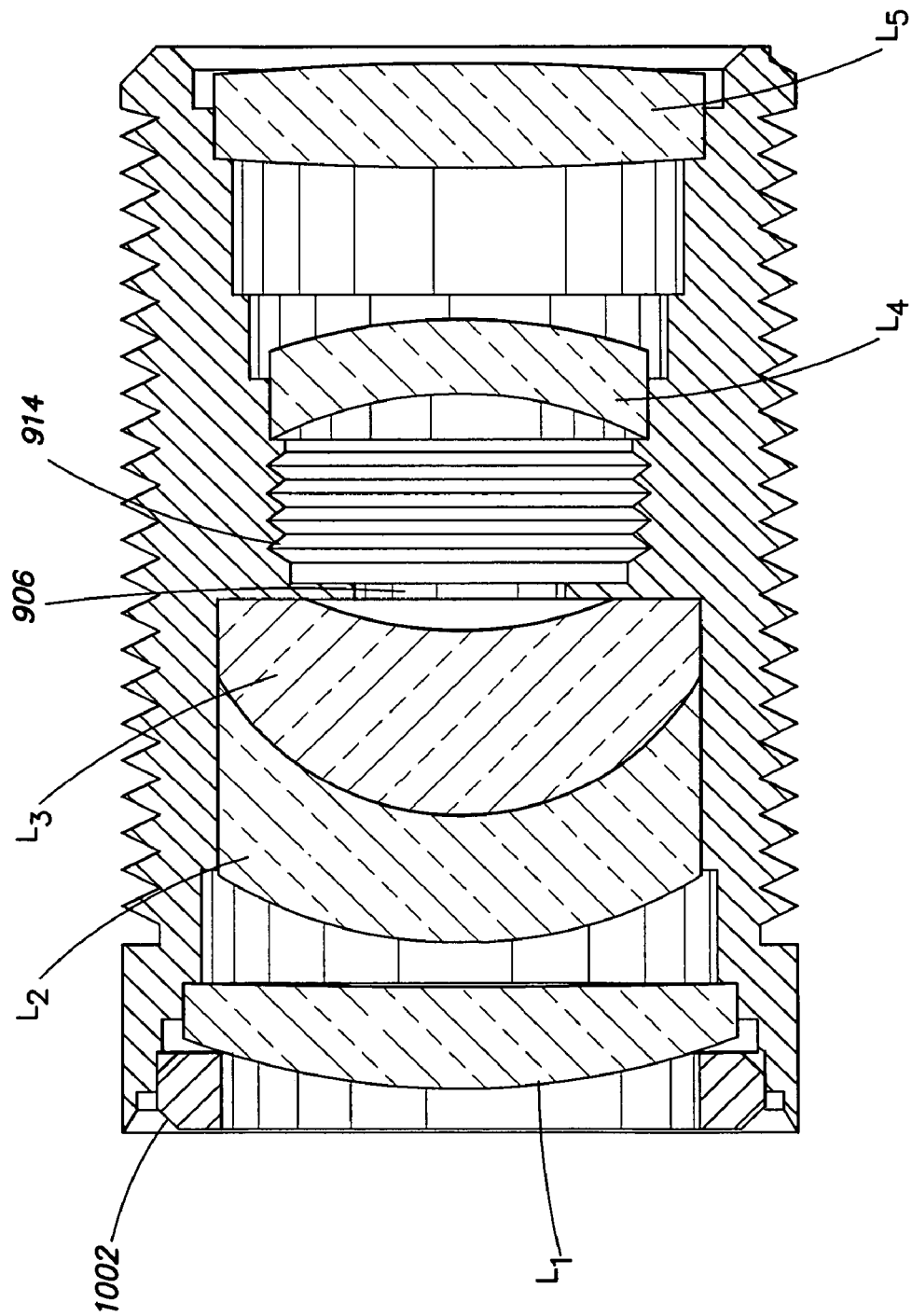
FIG. 10 illustrates the housing of FIG. 9 with lenses of a lens assembly according to the present invention.

FIG. 10 shows the housing 910 of FIG. 9 with the lenses $L_1$–$L_5$ of FIG. 1 disposed in the housing steps. Note that in this Figure. the housing 910 is rotated so that wrench flats 912 are not visible. Lens $L_1$ is disposed in housing step $hs_{14}$. Lenses $L_2$ and $L_3$ are disposed in housing step $hs_{16}$, which abuts the aperture stop 906. Lens $L_4$ is disposed in $hs_{17}$. Lens $L_5$ is disposed in $hs_{20}$. The lenses may fit snugly into the housing steps, or may be fixed within the housing steps by any suitable means, for example, glue. By using the step locations in the housing, the lenses are spaced appropriately to ensure proper function of the lens assembly. In other words, the distances $d_2$, $d_5$, $d_6$, and $d_8$ are maintained at appropriate values.

Figure 11B:
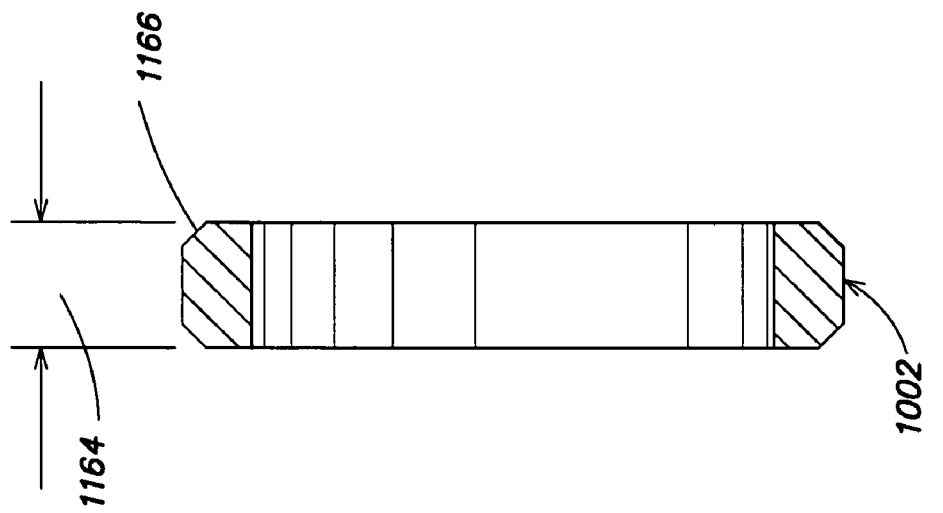
FIGS. 11A and 11B illustrate a lens retainer for use in connection with the housing of FIG. 9.
Figure 11A:
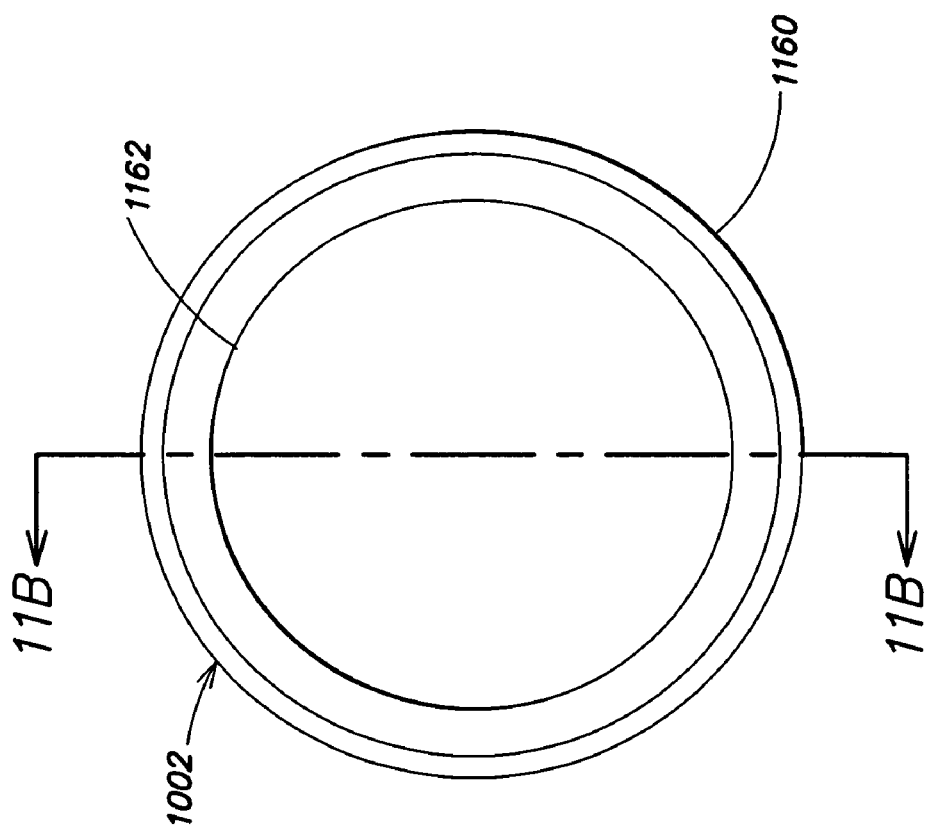

A lens retainer 1002 is disposed in housing step $hs_{12}$ to hold lens $L_1$ in place. The lens retainer 1002 is illustrated in FIGS. 11A and 11B. As seen in FIG. 11A, which is a front-on view of the lens retainer, the lens retainer 1002 has an outer circular diameter 1160 of approximately 8.2 mm, and an inner circular diameter 1162 of approximately 6.75 mm.

FIG. 11B is a side view of the lens retainer 1002. As shown, the lens retainer has an approximate thickness 1164 of 1 mm. The lens may have an edge 1166 that has a chamfer of approximately 45 degrees for approximately 0.2 mm. The lens retainer may fit snugly in the housing step $hs_{12}$. The lens retainer 1002 may be attached to the housing body using any suitable arrangement, such as welding, adhesively bonding, threading, interference fitting (e.g., press or shrink fitting), etc. as the present invention is not limited in this respect.

Tables 3 and 4 provide the prescription for lens assemblies according to embodiments in which the lens assembly of FIG. 1 is scaled to a focal length of approximately 25 mm. Again, the values shown in these tables could be scaled to provide a lens assembly having a different focal length. Such scaling of values is meant to be encompassed by the present invention.

TABLE 3

Prescription 1 For Lens Assembly of FIG. 1 with f = 25 mm

| Surface | Radius of Curvature r (mm) | Thickness d (mm) | Refractive Index (n) | Abbe No. (ν) |
|---|---|---|---|---|
| $S_1$ | 11.399 | 1.563 | 1.487 | 84.47 |
| $S_2$ | 95.674 | 0.260 | | |
| $S_3$ | 6.926 | 1.931 | 1.805 | 25.36 |
| $S_4$ | 4.107 | 2.902 | 1.620 | 60.32 |
| $S_5$ | 4.777 | 0.586 | | |
| $S_6$ | Aperture | 2.935 | | |
| $S_7$ | −6.393 | 1.116 | 1.717 | 47.96 |
| $S_8$ | −8.404 | 2.319 | | |
| $S_9$ | 38.523 | 1.674 | 1.744 | 44.72 |
| $S_{10}$ | −38.523 | | | |

TABLE 4

Prescription 2 For Lens Assembly of FIG. 1 with f = 25 mm

| Surface | Radius of Curvature r (mm) | Thickness d (mm) | Refractive Index (n) | Abbe No. (ν) |
|---|---|---|---|---|
| $S_1$ | 9.943 | 1.546 | 1.487 | 84.47 |
| $S_2$ | 55.798 | 0.204 | | |
| $S_3$ | 6.028 | 1.034 | 1.805 | 25.36 |
| $S_4$ | 4.097 | 2.930 | 1.620 | 60.32 |
| $S_5$ | 4.249 | 0.650 | | |
| $S_6$ | Aperture | 2.934 | | |
| $S_7$ | −5.196 | 0.930 | 1.717 | 47.96 |
| $S_8$ | −6.572 | 1.682 | | |
| $S_9$ | 47.134 | 1.277 | 1.744 | 44.72 |
| $S_{10}$ | −47.134 | | | |

Figure 12:
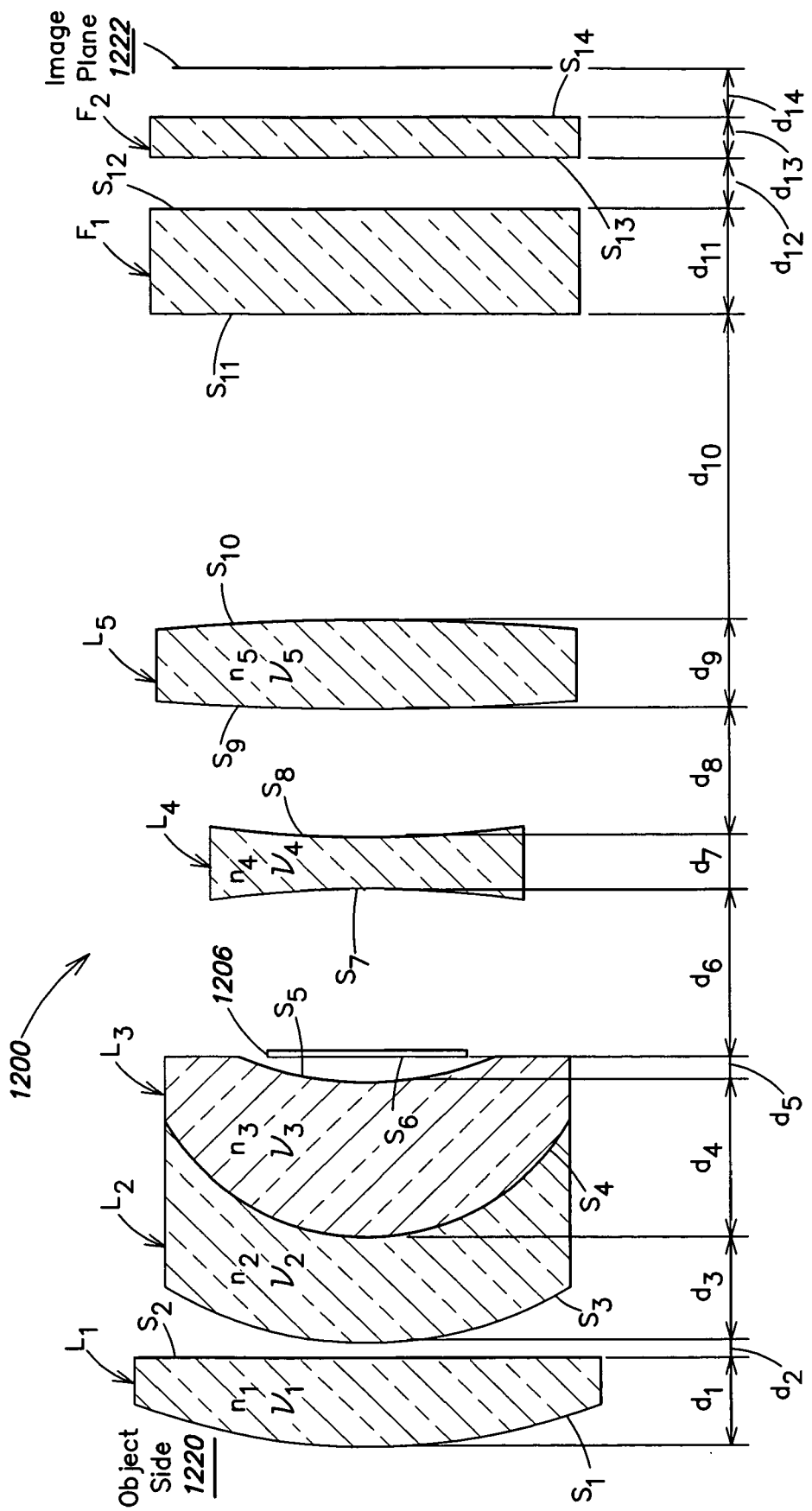
FIG. 12 shows an example of a structure of a lens assembly according to an embodiment of the present invention.

According to another embodiment, the lens assembly may take the form of lens assembly 1200 illustrated in FIG. 12. Note that in this figure the lenses and lens surfaces are labeled to correspond to the labels in FIG. 1, for purposes of simplification.

In this embodiment, lens assembly 1200 includes five lenses, $L_1$–$L_5$, disposed between an object side 1220 and an image plane 1222. In this embodiment, lens $L_1$ is a planoconvex lens. Lenses $L_2$ and $L_3$ are meniscus lenses and are cemented together. Lens $L_4$ is a bi-concave lens, and may be considered a perfect bi-concave lens. Lens $L_5$ is a bi-convex lens, and may be a considered a perfect bi-convex lens. An aperture stop 1206 is disposed between lens $L_3$ and lens $L_4$.

Tables 5–12 provide prescriptions for the lens assembly 1200 that conform to the general structure illustrated in FIG. 12. The embodiments of Tables 5–12 are scaled to a focal length of f=25. The values listed could be scaled to an alternative focal length, as would be known to one of skill in the art, and such scaling does not depart from the spirit of the invention.

TABLE 5

Prescription 1 For Lens Assembly of FIG. 12 with f = 25 mm

| Surface | Radius of Curvature r (mm) | Thickness d (mm) | Refractive Index (n) | Abbe No. (ν) |
|---|---|---|---|---|
| $S_1$ | 13.047 | 1.500 | 1.487 | 70.41 |
| $S_2$ | Infinity | 0.206 | | |
| $S_3$ | 6.863 | 1.930 | 1.805 | 25.36 |
| $S_4$ | 3.881 | 2.919 | 1.589 | 61.27 |
| $S_5$ | 5.517 | 0.586 | | |
| $S_6$ | Aperture | 1.331 | | |
| $S_7$ | −22.928 | 1.023 | 1.517 | 64.17 |
| $S_8$ | 12.188 | 1.330 | | |
| $S_9$ | 22.173 | 1.631 | 1.744 | 44.72 |
| $S_{10}$ | −22.173 | | | |

TABLE 6

Prescription 2 For Lens Assembly of FIG. 12 with f = 25 mm

| Surface | Radius of Curvature r (mm) | Thickness d (mm) | Refractive Index (n) | Abbe No. (ν) |
|---|---|---|---|---|
| $S_1$ | 13.899 | 1.414 | 1.487 | 70.41 |
| $S_2$ | Infinity | 0.203 | | |
| $S_3$ | 6.176 | 1.659 | 1.805 | 25.36 |
| $S_4$ | 3.714 | 3.289 | 1.589 | 61.27 |
| $S_5$ | 4.525 | 0.586 | | |
| $S_6$ | Aperture | 2.933 | | |
| $S_7$ | −15.249 | 1.006 | 1.517 | 64.17 |
| $S_8$ | 118.872 | 2.126 | | |
| $S_9$ | 28.563 | 1.425 | 1.744 | 44.72 |
| $S_{10}$ | −28.563 | | | |

TABLE 7

Prescription 3 For Lens Assembly of FIG. 12 with f = 25 mm

| Surface | Radius of Curvature r (mm) | Thickness d (mm) | Refractive Index (n) | Abbe No. (ν) |
|---|---|---|---|---|
| $S_1$ | 14.868 | 1.563 | 1.487 | 70.41 |
| $S_2$ | Infinity | 0.260 | | |
| $S_3$ | 6.737 | 1.931 | 1.805 | 25.36 |
| $S_4$ | 3.906 | 2.902 | 1.589 | 61.27 |
| $S_5$ | 5.393 | 0.586 | | |
| $S_6$ | Aperture | 2.935 | | |
| $S_7$ | −22.650 | 1.116 | 1.517 | 64.17 |
| $S_8$ | 15.203 | 1.045 | | |
| $S_9$ | 20.707 | 1.674 | 1.717 | 47.96 |
| $S_{10}$ | −20.707 | | | |

TABLE 8

Prescription 4 For Lens Assembly of FIG. 12 with f = 25 mm

| Surface | Radius of Curvature r (mm) | Thickness d (mm) | Refractive Index (n) | Abbe No. (ν) |
|---|---|---|---|---|
| $S_1$ | 13.128 | 1.429 | 1.487 | 70.41 |
| $S_2$ | Infinity | 0.200 | | |
| $S_3$ | 6.633 | 1.930 | 1.805 | 25.36 |
| $S_4$ | 3.812 | 2.954 | 1.589 | 61.27 |
| $S_5$ | 4.977 | 0.586 | | |
| $S_6$ | Aperture | 2.903 | | |
| $S_7$ | −20.549 | 1.007 | 1.517 | 64.17 |
| $S_8$ | 17.262 | 1.811 | | |
| $S_9$ | 21.847 | 1.640 | 1.717 | 47.96 |
| $S_{10}$ | −21.847 | | | |

TABLE 9

Prescription 5 For Lens Assembly of FIG. 12 with f = 25 mm

| Surface | Radius of Curvature r (mm) | Thickness d (mm) | Refractive Index (n) | Abbe No. (v) |
|---|---|---|---|---|
| $S_1$ | 13.633 | 1.563 | 1.487 | 70.41 |
| $S_2$ | Infinity | 0.260 | | |
| $S_3$ | 6.794 | 1.931 | 1.805 | 25.36 |
| $S_4$ | 3.865 | 2.902 | 1.607 | 56.65 |
| $S_5$ | 5.094 | 0.586 | | |
| $S_6$ | Aperture | 2.935 | | |
| $S_7$ | −24.337 | 1.116 | 1.517 | 64.17 |
| $S_8$ | 24.337 | 2.319 | | |
| $S_9$ | 24.948 | 1.674 | 1.717 | 47.96 |
| $S_{10}$ | −24.948 | | | |

TABLE 10

Prescription 6 For Lens Assembly of FIG. 12 with f = 25 mm

| Surface | Radius of Curvature r (mm) | Thickness d (mm) | Refractive Index (n) | Abbe No. (v) |
|---|---|---|---|---|
| $S_1$ | 13.957 | 1.417 | 1.487 | 70.41 |
| $S_2$ | Infinity | 0.203 | | |
| $S_3$ | 6.478 | 1.725 | 1.805 | 25.36 |
| $S_4$ | 3.776 | 3.176 | 1.607 | 56.65 |
| $S_5$ | 4.817 | 0.586 | | |
| $S_6$ | Aperture | 2.934 | | |
| $S_7$ | −19.451 | 1.013 | 1.517 | 64.17 |
| $S_8$ | 19.451 | 1.381 | | |
| $S_9$ | 22.012 | 1.605 | 1.717 | 47.96 |
| $S_{10}$ | −22.012 | | | |

TABLE 11

Prescription 7 For Lens Assembly of FIG. 12 with f = 25 mm

| Surface | Radius of Curvature r (mm) | Thickness d (mm) | Refractive Index (n) | Abbe No. (v) |
|---|---|---|---|---|
| $S_1$ | 14.878 | 1.563 | 1.517 | 64.17 |
| $S_2$ | Infinity | 0.260 | | |
| $S_3$ | 6.796 | 1.931 | 1.805 | 25.36 |
| $S_4$ | 3.872 | 2.902 | 1.620 | 60.32 |
| $S_5$ | 5.072 | 0.586 | | |
| $S_6$ | Aperture | 2.935 | | |
| $S_7$ | −24.452 | 1.116 | 1.487 | 70.41 |
| $S_8$ | 24.452 | 2.319 | | |
| $S_9$ | 25.942 | 1.674 | 1.717 | 47.96 |
| $S_{10}$ | −25.942 | | | |

TABLE 12

Prescription 8 For Lens Assembly of FIG. 12 with f = 25 mm

| Surface | Radius of Curvature r (mm) | Thickness d (mm) | Refractive Index (n) | Abbe No. (v) |
|---|---|---|---|---|
| $S_1$ | 14.813 | 1.358 | 1.517 | 64.17 |
| $S_2$ | Infinity | 0.205 | | |
| $S_3$ | 6.675 | 1.879 | 1.805 | 25.36 |
| $S_4$ | 3.809 | 3.104 | 1.620 | 60.32 |
| $S_5$ | 4.894 | 0.586 | | |
| $S_6$ | Aperture | 2.931 | | |
| $S_7$ | −21.412 | 1.020 | 1.487 | 70.41 |
| $S_8$ | 21.412 | 1.905 | | |
| $S_9$ | 24.205 | 1.559 | 1.717 | 47.96 |
| $S_{10}$ | −24.205 | | | |

Figure 13:
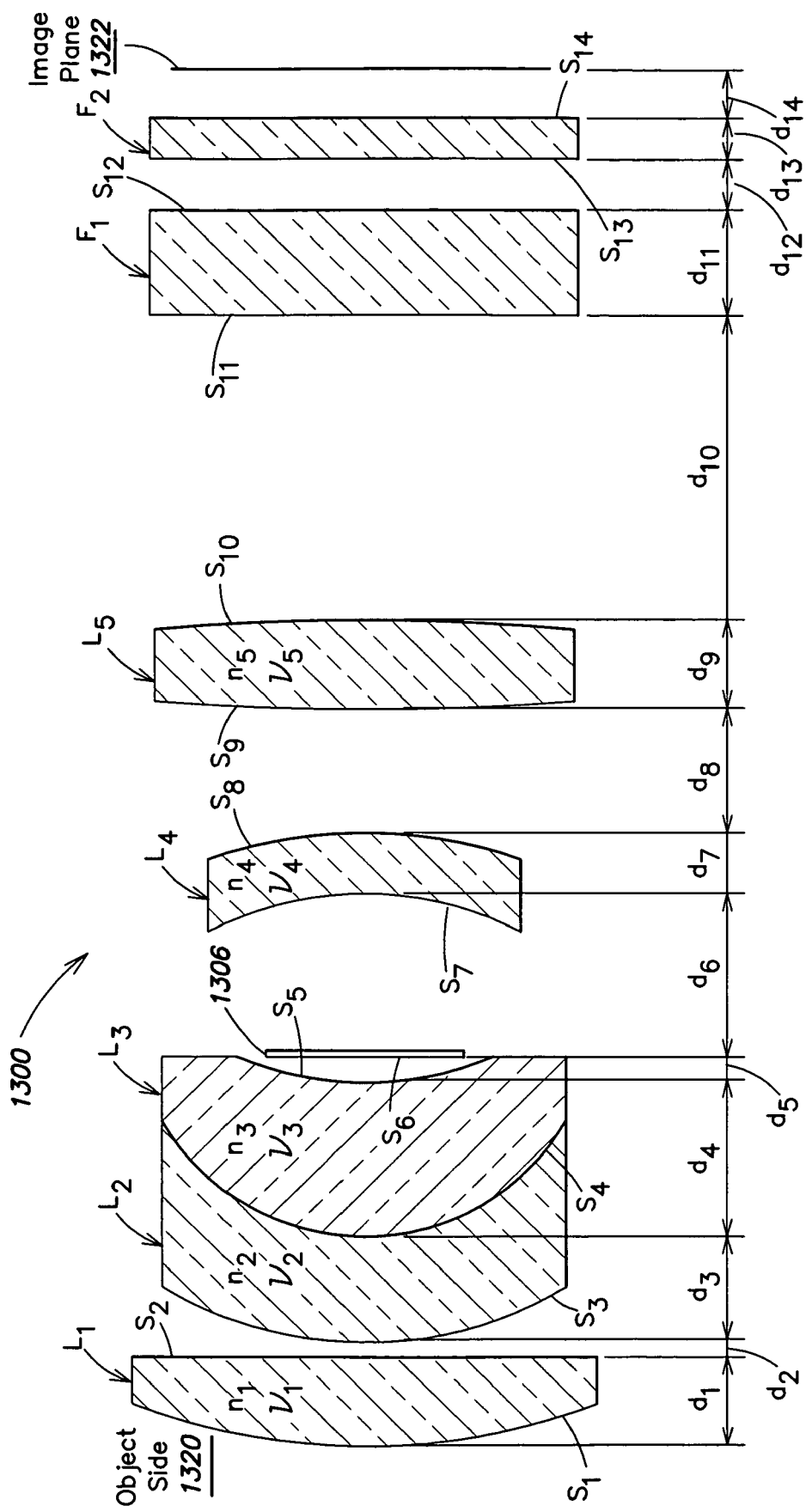
FIG. 13 shows an example of a structure of a lens assembly according to an embodiment of the present invention.

According to another embodiment, the lens assembly may take the form of lens assembly 1300 illustrated in FIG. 13. In this embodiment, lens assembly 1300 includes five lenses, $L_1$–$L_5$, disposed between an object side 1320 and an image plane 1322. In this embodiment, lens $L_1$ is plano-convex lens. Lenses $L_2$ and $L_3$ are meniscus lenses, and are cemented together. Lens $L_4$ is a meniscus lens having negative radii of curvature. Lens L5 is a bi-convex lens, and may be a considered a perfect bi-convex lens. An aperture stop 1306 is disposed between lens $L_3$ and lens $L_4$.

Tables 13 and 14 provide prescriptions of the elements of the lens assembly 1300 that conform to the general form illustrated in FIG. 13. The values listed could be scaled to an alternative focal length, as would be known to one of skill in the art, and such scaling does not depart from the spirit of the invention.

TABLE 13

Prescription 1 For Lens Assembly of FIG. 13 with f = 25 mm

| Surface | Radius of Curvature r (mm) | Thickness d (mm) | Refractive Index (n) | Abbe No. (v) |
|---|---|---|---|---|
| $S_1$ | 13.279 | 1.563 | 1.487 | 84.47 |
| $S_2$ | Infinity | 0.260 | | |
| $S_3$ | 6.606 | 1.931 | 1.805 | 25.36 |
| $S_4$ | 3.920 | 2.902 | 1.620 | 60.32 |
| $S_5$ | 4.569 | 0.586 | | |
| $S_6$ | Aperture | 2.155 | | |
| $S_7$ | −9.710 | 1.116 | 1.717 | 47.96 |
| $S_8$ | −16.572 | 2.935 | | |
| $S_9$ | 32.767 | 1.674 | 1.744 | 44.72 |
| $S_{10}$ | −32.767 | | | |

TABLE 14

Prescription 2 For Lens Assembly of FIG. 13 with f = 25 mm

| Surface | Radius of Curvature r (mm) | Thickness d (mm) | Refractive Index (n) | Abbe No. (v) |
|---|---|---|---|---|
| $S_1$ | 11.067 | 1.637 | 1.487 | 84.47 |
| $S_2$ | Infinity | 0.207 | | |
| $S_3$ | 5.771 | 0.875 | 1.805 | 25.36 |
| $S_4$ | 4.070 | 2.576 | 1.620 | 60.32 |
| $S_5$ | 4.078 | 0.750 | | |
| $S_6$ | Aperture | 0.591 | | |
| $S_7$ | −10.275 | 0.900 | 1.717 | 47.96 |
| $S_8$ | −16.300 | 2.931 | | |
| $S_9$ | 47.056 | 1.300 | 1.744 | 44.72 |
| $S_{10}$ | −47.056 | | | |

Figure 14:
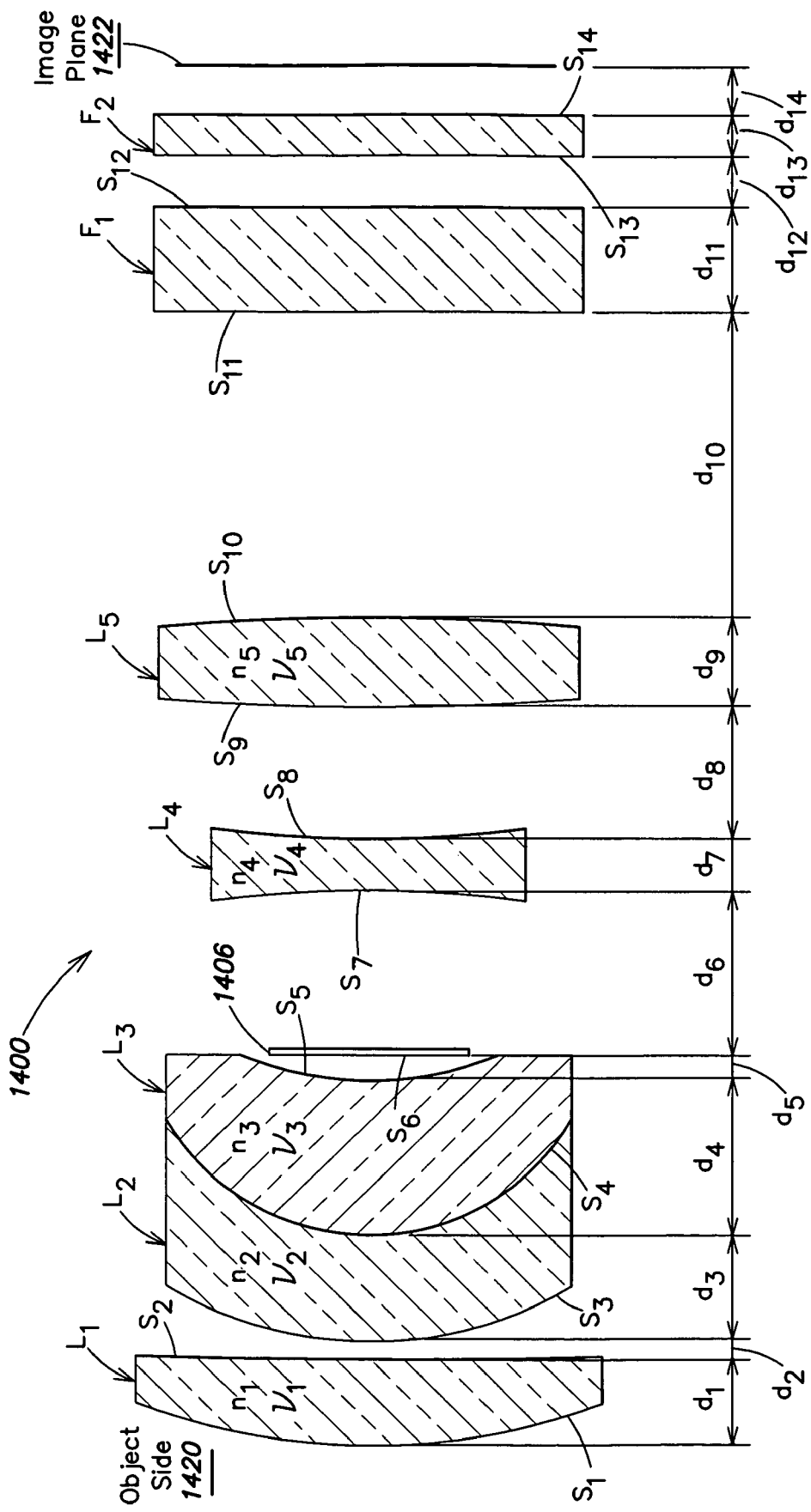
FIG. 14 shows an example of a structure of a lens assembly according to an embodiment of the present invention.

According to another embodiment, the lens assembly may take the form shown in FIG. 14. In this embodiment, lens assembly 1400 includes five lenses, $L_1$–$L_5$, disposed between an object side 1420 and an image plane 1422. Lens $L_1$ is meniscus lens having positive radii of curvature. Lenses $L_2$ and $L_3$ are meniscus lenses having positive radii of curvature and are cemented together. Lens $L_4$ is a bi-concave lens, and may be considered a perfect bi-concave lens. Lens $L_5$ is a bi-convex lens, and may be considered a perfect bi-convex lens. An aperture stop 1406 is disposed between lens $L_3$ and lens $L_4$.

In a more general sense, the design of the lens assemblies described thus far, according to the present invention, may obey any, all, or any combination of the relationships shown in Table 15. For purposes of this table, f represents the effective focal length of the lens assembly. The focal length of the individual lens elements is represented by $f_1$, $f_2$, etc. The focal length of the doublet including lenses $L_2$ and $L_3$ is represented by $f_2$, $f_3$. The radii of curvature for the respective surfaces are labeled as $r_1$, $r_2$, etc. In Table 15, the indices of refraction for the respective lens elements are represented by the notation $n_1$, $n_2$, etc, and the values of dispersion for the respective lens elements by $v_1$, $v_2$, etc. It should also be noted that for certain listings in table 15 the values correspond to a lens assembly scaled to an effective focal length f=25 mm. These relationships listings are clearly designated in Table 15, and it should be appreciated that the corresponding values may be scaled if the lens assembly is scaled to an alternative focal length.

TABLE 15

Ratios and Relationships For Lens Assembly $0.98 * f < d_1 + d_2 + d_3 + d_4 + d_5 + d_6 + d_7 + d_8 + d_9 + d_{10} + d_{11} + d_{12} + d_{13} + d_{14} < 1.02 * f$
$0.47 * f < d_1 + d_2 + d_3 + d_4 + d_5 + d_6 + d_7 + d_8 + d_9 < 0.61 * f$
20.4 mm < $f_1$ < 30.5 mm when assembly scaled to f = 25 mm
−100 mm < $f_{2,3}$ < 15 mm when assembly scaled to f = 25 mm
$1.49 < n_1 < 1.52$ and $v_1$ ^ 70
$1.8 < n_2$ and $24 < v_2 < 26$
−50 mm < $f_4$ < −35 mm when $1.5 < n_4 < 1.72$ and when assembly scaled to f = 25 mm
110 mm < $f_5$ < 540 mm when $n_5 > 1.7$ and when assembly scaled to f = 25 mm
$r_7/r_{10} < 0.3$ when $n_4/n_5 > 0.98$
$r_7/r_{10} > 0.5$ when $n_4/n_5 < 0.90$ As discussed above, an aspect of the present application provides correction for coma and astigmatism, as well as any other aberrations that may be introduced by using plane parallel plates with a lens assembly, for example, any of the lens assemblies 100, 1200, 1300, and 1400. According to one embodiment, the lens assembly includes compensating aberrations to compensate the aberrations of plane parallel plates. FIG. 15 is a non-limiting example of values of Seidel aberration coefficients, in units of waves, at a wavelength of 0.5876 µm for seven types of aberrations that may be introduced in the lens assembly according to the present invention. Values are listed for each of the surfaces $S_1$–$S_{14}$, as well as for the image itself, which in this example does not contribute any non-zero values. The seven types of aberrations listed are spherical aberration (W040), coma (W131), astigmatism (W222), field curvature (W220), distortion (W311), longitudinal chromatic aberration (W020), and tangential chromatic aberration (W111).

The total values listed for each type of aberration are computed by a sum of the value for each surface as well as the value for the image itself. The aperture stop (surface $S_6$) and the image do not contribute to the seven listed types of aberrations of the system, as indicated by the values of zero in the appropriate rows. As indicated by the total values in FIG. 15, satisfactory optical performance may be retained even with the planar plates. In this non-limiting example, the Petzval radius is −704.0739.

As previously mentioned, in some embodiments, the lens assemblies provide less than 1% distortion. Many waves of distortion in the exit pupil may be required to produce 1% error in the image height relative to the full field image height. Distortion at any one field may appear to be similar to tilt. Distortion without deteriorating the image quality of a point image may occur With respect to FIG. 15, the details for converting from waves to percent distortion are:

W311 is the distortion coefficient in waves at the full field, and full pupil. At the full field, W311*p describes the wavefront in the y direction, which resembles a tilted wavefront relative to the ideal reference wavefront. The tilted wavefront at full field forms an angle relative to the reference wavefront in the exit pupil. A ray projected normal from the wavefront will land on the image plane with some height relative to the height of a ray from the reference wavefront. The difference in ray height is $e_y$. Distortion is then computed by dividing $e_y$ by the height of the nominal full field image height, which can be obtained from a paraxial ray trace.

In general: $e_y = -(R*lambda)/n*(W)'$

For distortion: $e_y = -(R*lambda)/n*(W311*p)'$ where $(W311*p)'$ is the derivative of $(W311*p)$ with respect to y, and R is the distance from the exit pupil to the image plane. This reduces to $$e_y = -(R*lambda)/(n*Ymax\_pupil)*W311.$$

After rearranging terms this is equal to the expression for transverse distortion $$e_y = -(R/Ymax\_pupil)*(lambda/n)*W311$$

$$e_y = (lambda*W311)/(n'u')$$

where u' is the image space paraxial marginal ray angle.

Lastly, percent distortion is computed with the following using $e_y$.

Percent distortion: $Dist=(e_y/Yc)*100\%$ where Yc is the paraxial chief ray height.

An example of the numbers for a lens assembly according to the present invention, when scaled for use with a ⅓ inch CCD detector are now given, specifically using the total value of W311 from FIG. 15:

using $e_y = (lambda*W311)/(n'u')$ (or the other equation)

$e_y = (0.5876E\text{-}3 \text{ mm}*-4.858511)/(-0.1175)$ $e_y = 0.02429$ mm distortion=0.02429 mm/3.0485 mm*100% distortion=0.797%

The percent distortion computed with real rays relative to the scaled image height from a very small field at wavelength no. 2 (which is called the primary wavelength, in ZEMAX, an optical design program) is 0.793%, and therefore less than 1%.

As described above, another aspect of the invention relates to a multi-head imaging device for imaging an object. As shown schematically in FIG. 16, the multi-head imaging device 1602 includes two distinct lens assemblies, 1604 and 1606, that may be identical to each other or different from each other. Each lens assembly is associated with a distinct detector, 1608 and 1607, respectively. The detector may be a CCD, CMOS, film-based or any suitable combination thereof. Of course other types of detectors may be employed, as the present invention is not limited in this respect.

The multi-head imaging device may include any suitable lens assembly as desired, to produce a desired image of the object. Although the lens assemblies may be identical to each other or otherwise produce an identical or similar result, in one embodiment, one lens assembly is a constant focus lens assembly. In one embodiment, one of the lens assemblies is a wide-angle lens assembly. In another embodiment, one lens assembly is a 40 degree field of view lens, such as that described in co-pending U.S. patent application Ser. No. 10/798,841, assigned to the assignee of the present application and hereby incorporated by reference in its entirety. Other suitable wide angle lens assemblies may be employed, as the present invention is not limited in this respect. Similarly, any of the lens assemblies described herein or in the '841 application may be employed. In one embodiment, one of the lens assemblies is a 15 degree field of view lens. In another embodiment, one of the lens assemblies is a relatively high magnification lens or a telephoto or moderate telephoto lens assembly, for example, a lens assembly providing approximately a 10× magnification.

As shown in FIG. 17, the multi-head imaging device 1602 includes a housing 1610 adapted to receive the lens assemblies 1604, 1606. In one embodiment, the housing 1610 includes receptacles 1612, 1614, each configured to receive a respective one of the lens assemblies. To facilitate holding the lens assemblies in the housing, the receptacles may be threaded with a thread corresponding to the threaded housings of the lens assemblies as described with reference to FIGS. 6–11.

In one embodiment, the lens assemblies are positioned in the housing of the multi-head imaging device in a manner such that the optical viewing axes of the lens assemblies are substantially parallel. Of course, the present invention is not limited in this respect, as the axes need not be parallel.

The housing 1610 may be formed as an integral unitary construction or may be constructed with two or more components joined together. In one embodiment, the housing comprises a lens assembly housing component constructed to receive the lens assemblies as described above and a back plate component that covers the back side of the housing 1610. By providing such a two piece construction, disposing the detectors within the housing 1610 may be facilitated. Of course, the present invention is not limited in this respect, as additional components may be employed to form the housing 1610.

In one embodiment, the housing 1610 has a width (w) of approximately 1.4 inches, a height (h) of approximately 0.57 inches, and a depth (d1) of approximately 0.9 inches and a depth (d2) of approximately 0.52 inches. Thus, in one embodiment, the housing 1610 fits within an envelope of approximately 1.5 inch by 0.75 inch by 1 inch. Of course, the present invention is not limited in this respect, as the housing may be formed with any suitable size.

Figure 16:
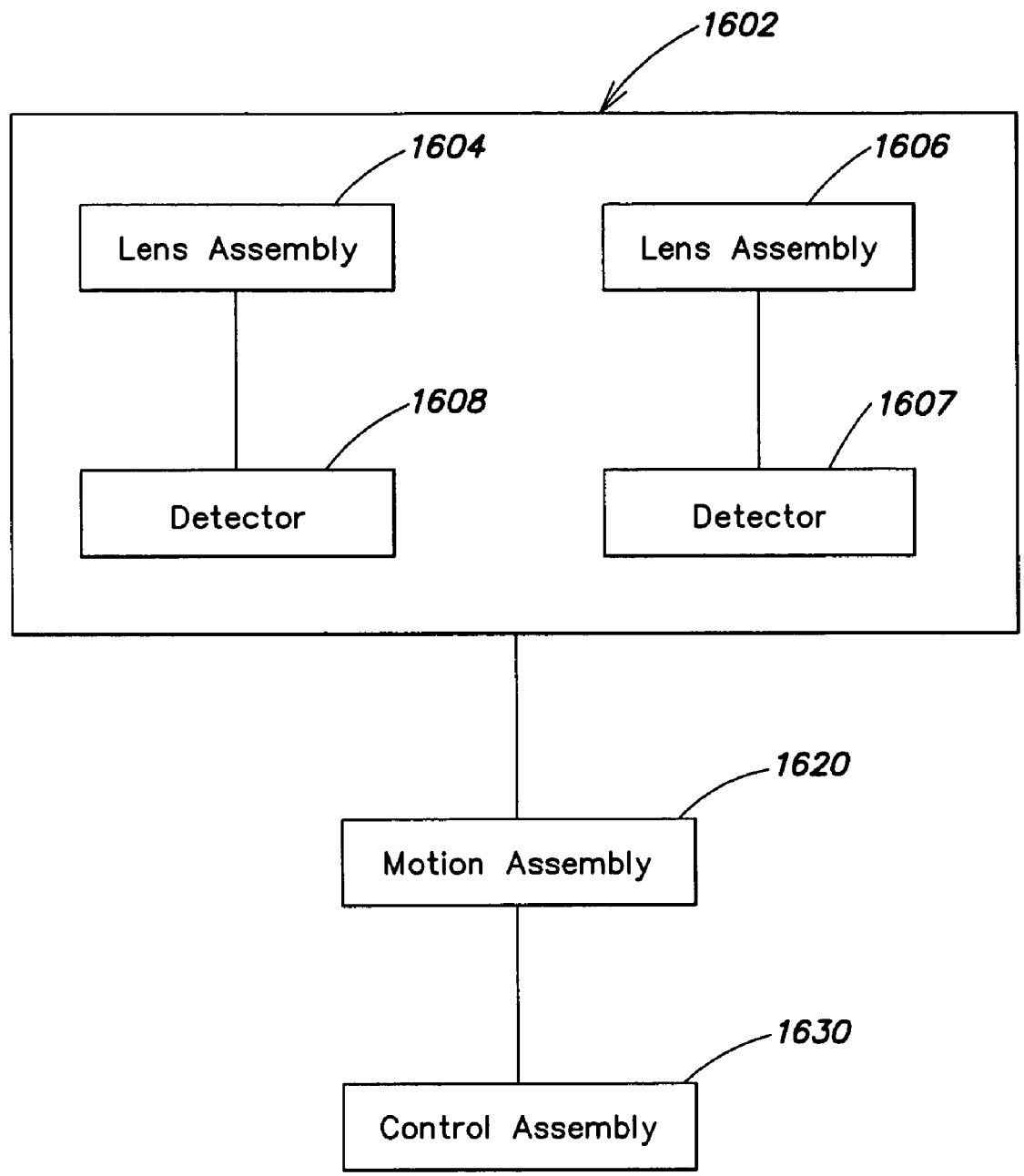
FIG. 16 is a schematic representation of a multi-head imaging device according to an aspect of the present invention.

The multi-head imaging device may be mounted to a motion assembly 1620, as shown in FIGS. 16 and 17 to provide the ability to move the multi-head imaging device in a desired orientation. In one embodiment, the multi-head imaging device is mounted to a mount that provides pan and tilt motion. This may be provided with the use of a gear arrangement 1622, shaft 1624 and yoke 1626, as shown. However, other suitable arrangements for providing motion may be employed, as the present invention is not limited in this respect. The pan/tilt mount 1620 may be coupled to a control assembly 1630. The control assembly controls the movement and/or function of the dual-head assembly 1602.

Although not shown, a housing cover, which may be formed as a dome, may be employed, whereby the lens assemblies are able to view the object through the dome. The dome may be made of glass, plastic, or any other suitable material, and the invention is not limited in this respect. In one embodiment, the dome is optically clear.

According to one embodiment, a user may view an image provided by one of the two distinct lens assemblies. The user may choose which lens assembly through which to view an object and may switch lens assemblies through which to view the object, as desired. Thus, a user may manually switch between lens assemblies. Alternatively, or in addition, switching between views may occur automatically and may be programmed or controlled by software. In one embodiment, switching between lens assemblies may occur in response to a trigger event (which may be a programmed event or a detected event). In one embodiment, switching between lens assemblies may occur upon motion occurring in the field of view or a predetermined object in or entering the field of view. In one embodiment, switching between views may occur instantaneously.

For example, initially an image produced by lens assembly 1606 may be viewed. Upon detecting motion, or an object of interest in the field of view of lens assembly 1606, a switch may occur to enable viewing an image produced by lens assembly 1604. The motion, movement, and operation of the dual-head assembly 1602 may be controlled by a user, a computer, or any other means, as the invention is not limited in this respect.

Although certain embodiments are described as including only two lens assemblies, the present invention is not limited in this respect, as additional lens assemblies may be provided in a multi-lens assembly head.

The lens assemblies described herein may be used in various applications and environments. For example, one field of use may be security cameras. Security cameras may be used in banks, casinos, retail stores, personal property, yards, airports, sports and entertainment arenas, theaters, restaurants, cars, office buildings, gas stations, security checkpoints, boarder or other boundary crossings, transportation vehicles and terminals, such as trains and train stations, ships and docks, buses and bus depots, military installations, etc. as the present invention is not limited in this respect.

The lens assemblies described herein may also be used for industrial applications. Examples of this sort of use may include flexible bore scopes with a distal chip, cameras for insertion into wells, cameras for viewing engines (such as aircraft engines) and engine parts, cameras for viewing under buildings or cars, cameras used for measurement, or any other industrial application. The lens assemblies described herein may also be used for personal or business applications. Examples of this sort may include personal cameras, digital cameras, phone cameras, web cameras, disposable cameras, videography, or any other type of camera or system.

The lens assemblies described herein may also be used for personal or business applications. Examples of this sort may include personal cameras, digital cameras, phone cameras, web cameras, disposable cameras, videography, or any other type of camera or system.

The lens assemblies described herein may also be used for medical applications. For example, the lens assemblies may be used for endoscopy with a distal chip, dental procedures, gynecological exams, ear/nose/throat exams, distal chip colonoscopy, distal chip laparoscopy, or any other medical procedures or uses.

Other applications will be readily apparent to those of skill.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Further, although each embodiment described above includes certain features, the invention is not limited in this respect. Thus, one or more of the above-described or other features of the lens assembly, may be employed singularly or in any suitable combination, as the present invention is not limited to a specific embodiment. Accordingly, the foregoing description and drawings are by way of example only.

What is claimed is:

1. A lens assembly comprising:
    a plurality of lenses for producing an image of an object, the plurality of lenses adapted to provide:
    a field of view of approximately 15 degrees;
    approximately 0% vignetting within the field of view;
    a distortion of the image of less than approximately 1%;
    wherein the plurality of lenses includes five lenses, wherein the five lenses include, in order from an object side to an image side:
    a first lens;
    a first meniscus lens;
    a second meniscus lens;
    a fourth lens; and
    a bi-convex lens.

2. The lens assembly of claim 1, wherein the plurality of lenses are configured to define a focal length, and wherein a length of the plurality of lenses is approximately equal to the focal length.

3. The lens assembly of claim 1, further comprising:
    an aperture stop in optical communication with the plurality of lenses.

4. The lens assembly of claim 3, wherein the plurality of lenses is non-symmetrical about the aperture stop.

5. The lens assembly of claim 1, further comprising:
    at least one planar plate in optical communication with the plurality of lenses.

6. The lens assembly of claim 5, wherein the plurality of lenses is further adapted to provide:
    offsetting aberrations to compensate for aberrations introduce by the at least one planar plate.

7. The lens assembly of claim 1, wherein the first lens is a plano-convex lens.

8. The lens assembly of claim 1, wherein the first lens is a meniscus lens.

9. The lens assembly of claim 1, wherein the fourth lens is a meniscus lens.

10. The lens assembly of claim 1, wherein the fourth lens is a bi-concave lens.

* * * * *